(12) United States Patent
Hayakawa et al.

(10) Patent No.: US 9,977,740 B2
(45) Date of Patent: May 22, 2018

(54) NONVOLATILE STORAGE OF HOST AND GUEST CACHE DATA IN RESPONSE TO POWER INTERRUPTION

(71) Applicant: Hitachi, Ltd., Tokyo (JP)

(72) Inventors: Norimitsu Hayakawa, Tokyo (JP); Masatoshi Konagaya, Yokohama (JP); Takao Totsuka, Tokyo (JP); Yukari Hatta, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 15/114,114

(22) PCT Filed: Mar. 7, 2014

(86) PCT No.: PCT/JP2014/055878
§ 371 (c)(1),
(2) Date: Jul. 26, 2016

(87) PCT Pub. No.: WO2015/132941
PCT Pub. Date: Sep. 11, 2015

(65) Prior Publication Data
US 2017/0004081 A1    Jan. 5, 2017

(51) Int. Cl.
*G06F 11/00* (2006.01)
*G06F 12/0804* (2016.01)
(Continued)

(52) U.S. Cl.
CPC ............ *G06F 12/0804* (2013.01); *G06F 9/46* (2013.01); *G06F 11/1441* (2013.01);
(Continued)

(58) Field of Classification Search
CPC ...... G06F 12/0804; G06F 12/08; G06F 12/16; G06F 11/1441; G06F 11/1451;
(Continued)

(56) References Cited

U.S. PATENT DOCUMENTS 8,479,198 B2 * 7/2013 Hayakawa .......... G06F 9/45558
                                                          718/1
8,881,148 B2 * 11/2014 Diaz .................... G06F 9/45533
                                                        713/323
(Continued)

FOREIGN PATENT DOCUMENTS

JP    11-149385 A    6/1999
WO    2009/113394 A1    9/2009

OTHER PUBLICATIONS

International Search Report of PCT/JP2014/055878 dated Jun. 10, 2014.

*Primary Examiner* — Marc Duncan
(74) *Attorney, Agent, or Firm* — Mattingly & Malur, PC

(57) ABSTRACT

A computer, on which a plurality of operating systems run, wherein the plurality of operating systems includes a first operating system and a second operating system configured to generate a plurality of virtual computers. The first operating system runs on a first logical resource, and the second operating system runs on a second logical resource. A third operating system runs on each of the plurality of virtual computers. The third operating system secures a cache memory area in a virtual memory. The second operating system generates location information, which indicates a location of the cache memory area in a physical address space that the second operating system manages. The first operating system obtain data stored in the cache memory area based on the location information.

10 Claims, 16 Drawing Sheets

(51) Int. Cl.
*G06F 12/08* (2016.01)
*G06F 12/16* (2006.01)
*G06F 9/46* (2006.01)
*G06F 11/14* (2006.01)

(52) U.S. Cl.
CPC ...... *G06F 11/1451* (2013.01); *G06F 11/1469* (2013.01); *G06F 12/08* (2013.01); *G06F 12/16* (2013.01); *G06F 2201/805* (2013.01); *G06F 2201/815* (2013.01); *G06F 2201/82* (2013.01); *G06F 2212/1032* (2013.01); *G06F 2212/283* (2013.01)

(58) Field of Classification Search
CPC ........ G06F 11/1469; G06F 9/46; G06F 9/461; G06F 2201/805; G06F 2201/815; G06F 2201/82; G06F 2212/1032; G06F 2212/283
See application file for complete search history.

(56) References Cited

U.S. PATENT DOCUMENTS

| | | | | |
|---|---|---|---|---|
| 8,984,244 | B2* | 3/2015 | Nicholas | G06F 9/4418 711/162 |
| 9,128,715 | B2* | 9/2015 | Stenfort | G06F 3/0605 |
| 9,875,115 | B2* | 1/2018 | Russinovich | G06F 9/4418 |
| 2006/0136667 | A1* | 6/2006 | Shultz | G06F 9/5077 711/118 |
| 2006/0136765 | A1* | 6/2006 | Poisner | G06F 11/1441 713/323 |
| 2008/0276040 | A1* | 11/2008 | Moritoki | G06F 11/1441 711/113 |
| 2011/0202728 | A1* | 8/2011 | Nichols | G06F 9/461 711/141 |
| 2012/0272235 | A1* | 10/2012 | Fahrig | G06F 9/45558 718/1 |
| 2013/0152087 | A1* | 6/2013 | Hendel | G06F 9/45533 718/1 |

* cited by examiner

GPA-HPA MAPPING INFORMATION

| GPA | HPA | SIZE |
|---|---|---|
| ⋮ | ⋮ | ⋮ |
| 0000_0002_4000_0000h | 0000_0004_3000_0000h | 2MB |
| ⋮ | ⋮ | ⋮ |
| 0000_0003_2000_0000h | 0000_0002_5000_0000h | 2MB |
| ⋮ | ⋮ | ⋮ |
| 0000_0008_4000_0000h | 0000_0010_8000_0000h | 1GB |
| ⋮ | ⋮ | ⋮ |

GVA-GPA MAPPING INFORMATION 430

| GVA (431) | GPA (432) | SIZE (433) |
|---|---|---|
| ⋮ | ⋮ | ⋮ |
| 0000_0001_7000_0000h | 0000_0003_2000_0000h | 2MB |
| ⋮ | ⋮ | ⋮ |
| 0000_0001_8000_0000h | 0000_0008_4000_0000h | 1GB |
| ⋮ | ⋮ | ⋮ |
| 0000_0002_4000_0000h | 0000_0009_0000_0000h | 2MB |
| ⋮ | ⋮ | ⋮ |

*FIG. 6*

GOS_VCM GPA SPACE LOCATION INFORMATION 440

| ID (441) | GPA (442) | SIZE (443) |
|---|---|---|
| 1 | 0000_0003_2000_0000h | 256MB |
| 2 | 0000_0008_4000_0000h | 3.5GB |
| 3 | 0000_0002_4000_0000h | 256MB |

*FIG. 7*

GOS_VCM HPA SPACE LOCATION INFORMATION 600

| ID (601) | HPA (602) | SIZE (603) |
|---|---|---|
| 1 | 0000_0002_5000_0000h | 256MB |
| 2 | 0000_0010_8000_0000h | 3.0GB |
| 3 | 0000_0000_4000_0000h | 512MB |
| 4 | 0000_0004_3000_0000h | 256MB |

*FIG. 8*

NVCM NVA MANAGEMENT INFORMATION

| OS_ID | NVA | SIZE |
|---|---|---|
| HOS1 | 0000_8000_0000h | 2GB |
| GOS1 | 0001_8000_0000h | 4GB |
| ⋮ | ⋮ | ⋮ |
| GOSn | 000F_0000_0000h | 2GB |

*FIG. 9*

NONVOLATILE STORAGE OF HOST AND GUEST CACHE DATA IN RESPONSE TO POWER INTERRUPTION

BACKGROUND OF THE INVENTION

This invention relates to a cache data backup technology and a cache data restoration technology in a computer to which a multi-OS technology and a virtual machine technology are applied.

In a system where a client apparatus reads and writes data from/to a file server, a database server, and other similar server apparatus to which the client apparatus is coupled through a LAN including the Ethernet or the like, and each server apparatus serving as a back end reads and writes data from/to a storage apparatus to which the server apparatus is coupled through a SAN including a Fibre Channel or the like, a cache memory is generally installed in the storage apparatus and each server apparatus for improvement in system performance, or other reasons. The cache memory is typically located in a system memory, which includes a volatile memory such as a DRAM. For instance, a cache memory having as large a capacity as several to several tens gigabytes is installed in a large-scale storage apparatus equipped with a large-capacity HDD, and the storage apparatus responds to I/O access requests to access a front-end apparatus while caching application data into the cache memory during its operation.

In a case where power is cut off unexpectedly in this type of apparatus, a loss of a huge amount of data on the cache memory is prevented by supplying power temporarily from a battery that is a secondary power source and backing up the cache data to an NVRAM (a non-volatile memory) such as an SSD, which can be accessed more quickly than the HDD. Multi-processor apparatus, which includes multiple processors, take this one step further and keep power consumption during battery operation small by feeding power to only one of the processors and allowing this processor alone to execute the operation of backing up the cache memory.

In recent years, a technology of booting up two or more operating systems (OSes) on a single physical computer in order to make most of hardware resources on a physical computer is attracting attention (see, for example, JP 11-149385 A and WO 2009/113394 A1).

In JP 11-149385 A, there is described a "multi-operating system computer in which a first operating system (OS) configured to execute, in the order of priority, a plurality of tasks having priority levels set thereto and a second OS separate from the first OS are alternately put into operation as an active OS, and which includes an OS switching module configured to switch the active OS from the first OS to the second OS when the first OS is in operation as the active OS and a given task that has a given level of priority set thereto and that is used as a switching trigger task for identifying an occasion to switch the active OS is executed out of the plurality of tasks".

In WO 2009/113394 A1, there is disclosed a "multi-OS booting apparatus according to the present invention, which boots at least two operating systems (operating system hereinafter called an OS) of a first OS and a second OS, includes: (1) a primary storage unit having a memory area with respect to which a memory space is defined; (2) a secondary storage unit for storing a second boot loader and the second OS; (3) an OS execution unit for causing a first boot loader to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (4) a loader execution unit for causing the second boot loader to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, for causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and for causing the second boot loader to perform switching from the context for the second loader to the context generated for the second OS, and to boot the second OS in the context for the second OS".

Space saving and a lower price can be expected by utilizing this multi-OS technology to install a storage control OS as a first OS (first host OS), install a virtual machine monitor (VMM) as a second OS (second host OS), and install server control OSes as OSes (a guest OS1 to a guest OSn) that are run on a plurality of virtual machines (VM1 to VMn) on the virtual machine monitor. In addition, improvement in I/O data read/write performance can be expected by executing I/O data read/write, which has been performed over a SAN with older technologies, via a memory shared between the first host OS and the guest OSes.

SUMMARY OF THE INVENTION

A computer system that uses the multi-OS technology and the virtual machine technology to install a plurality of host OSes in a single piece of hardware (computer) and to run a plurality of guest OSes on at least one of the host OSes needs a way to back up data related to the host OSes and the guest OSes to an NVRAM or the like while keeping power consumption small when power is cut off unexpectedly.

For example, a demand described below needs to be met in a computer system where a first host OS (storage control OS) and a second host OS (VMM), which runs a plurality of guest OSes (server control OSes), are installed in a single computer. Specifically, the demand is to back up, when power is cut off unexpectedly in the computer system, to an NVRAM, pieces of data that are stored in cache memories allocated to the respective guest OSes, in addition to data that is stored in a cache memory allocated to the first host OS itself, by using only one processor that is used by the first host OS.

(1) However, the guest OSes are managed by the second host OS and the first host OS has no way of knowing where in the physical address space the cache memories allocated to the guest OSes are located. The related art thus does not allow the first host OS to back up data of cache memories allocated to the guest OSes to an NVRAM.

(2) After the computer system recovers from the power cut state and is rebooted, the first host OS needs to restore the backed-up data in the NVRAM to the cache memories allocated to the guest OSes. However, the cache memories allocated to the guest OSes after the reboot of the computer system may be located differently in the physical address space than before the reboot. The first host OS therefore does not know the locations of the cache memories allocated to the guest OSes, and is unable to restore backup data of the guest OSes properly.

It is an object of this invention to provide a method with which, in a computer system having a plurality of host OSes installed therein and running a plurality of guest OSes on at least one of the host OSes, one host OS backs up data stored in a cache memory of this host OS and data stored in cache memories that are allocated to guest OSes running on another host OS.

Another object of this invention is to provide a method with which backup data of the respective guest OSes is restored properly even when the locations in the physical address space of the cache memories allocated to the guest OSes change before and after reboot.

The present invention can be appreciated by the description which follows in conjunction with the following figures, wherein: a computer, on which a plurality of operating systems run, the computer comprising, as physical resources: a processor; a volatile memory coupled to the processor; a non-volatile memory coupled to the processor; and an I/O device coupled to the processor. The plurality of operating systems includes a first operating system and a second operating system configured to generate a plurality of virtual computers. The first operating system is configured to run on a first logical resource, the first logical resource including a first logical processor, which is created by logically dividing the processor, a first logical volatile memory, which is created by logically dividing the volatile memory, and a first logical I/O device, which is created by logically dividing the I/O device. The first operating system includes a power cut detecting unit configured to detect cutting of power to the computer. The second operating system is configured to run on a second logical resource, the second logical resource including a second logical processor, which is created by logically dividing the processor, a second logical volatile memory, which is created by logically dividing the volatile memory, and a second logical I/O device, which is created by logically dividing the I/O device. A third operating system is configured to run on each of the plurality of virtual computers. The first operating system is configured to: secure in the first logical volatile memory, a first cache memory area in which data is to be stored temporarily in a case where the first operating system is booted up; and generate first location information, which indicates a location of the first cache memory area in a physical address space of the first logical volatile memory that the first operating system manages. The second operating system is configured to generate at least one virtual computer and to boot up the third operating system on the at least one virtual computer. The third operating system is configured to secure a second cache memory area in a virtual memory that is allocated to the at least one virtual computer. The second operating system is configured to generate second location information, which indicates a location of the second cache memory area in a physical address space of the second logical volatile memory that the second operating system manages. The first operating system is configured to: obtain first data stored in the first cache memory area based on the first location information in a case of being detected the cutting of power to the computer; store the first data in the non-volatile memory; obtain the second location information; obtain second data stored in the second cache memory area from the second logical volatile memory based on the second location information; and store the second data in the non-volatile memory.

According to this invention, the first operating system is capable of quickly backing up cache data of the first operating system and cache data of the third operating system when a power cut is detected, without executing address conversion processing or similar processing. Problems, configurations, and effects other than described above will become apparent from a description of an embodiment below.

BRIEF DESCRIPTION OF THE DRAWINGS

The present invention can be appreciated by the description which follows in conjunction with the following figures, wherein:

FIG. 6 is an explanatory diagram for showing an example of GVA-GPA mapping information according to the first embodiment of this invention;

FIG. 7 is an explanatory diagram for showing an example of GOS_VCM GPA space location information according to the first embodiment of this invention;

FIG. 8 is an explanatory diagram for showing an example of GOS_VCM HPA space location information according to the first embodiment of this invention;

FIG. 9 is an explanatory diagram for showing an example of NVCM NVA management information according to the first embodiment of this invention;

DETAILED DESCRIPTION OF THE PREFERRED EMBODIMENTS

An embodiment of this invention is described below with reference to the drawings. The outline of this invention is described first with reference to FIG. 1.

Figure 1:
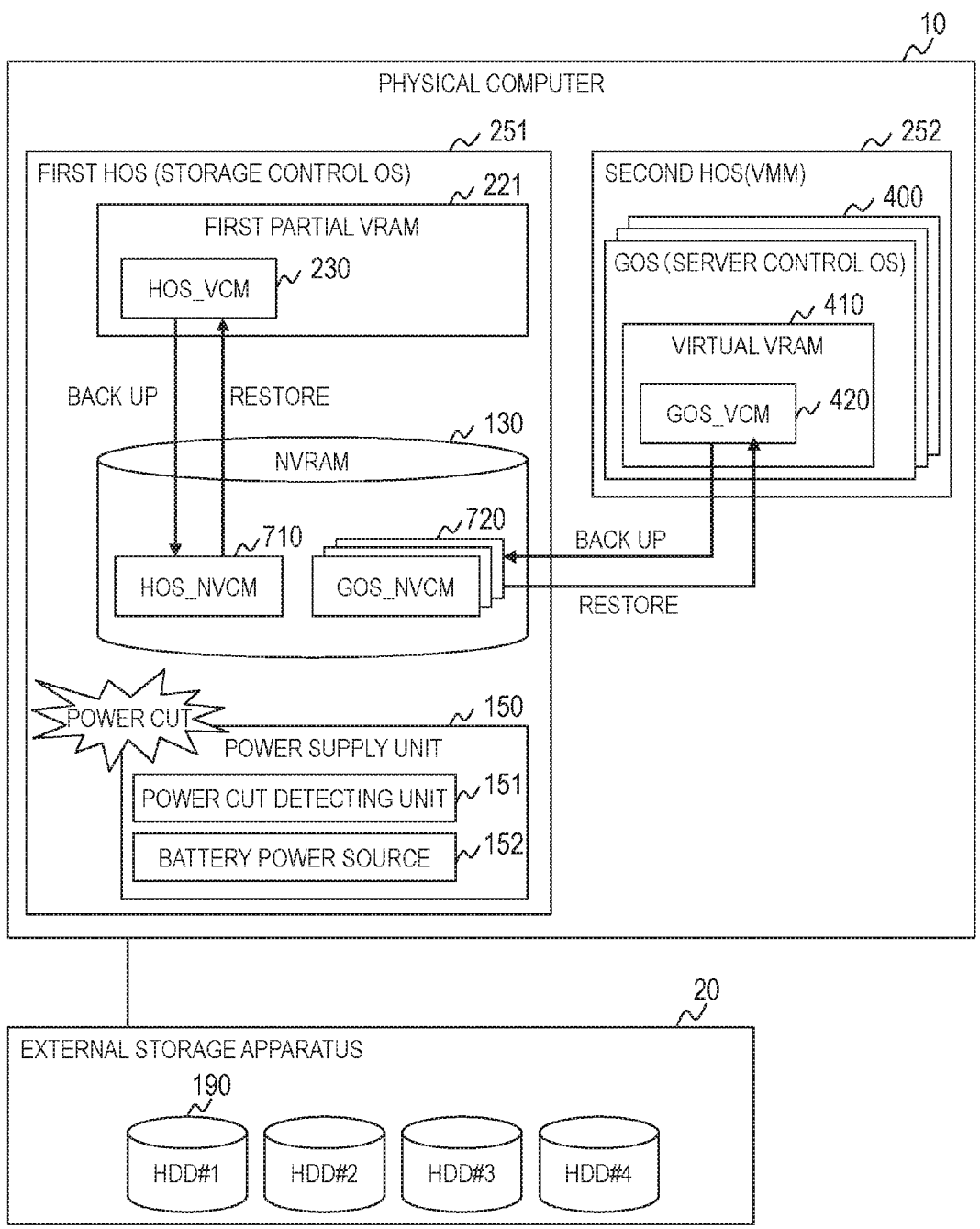
FIG. 1 is a block diagram for illustrating the outline of this invention.

FIG. 1 is a block diagram for illustrating the outline of this invention. The outline of this invention described below takes as an example a computer system including a physical computer 10 and an external storage apparatus 20.

Two host OSes, namely, a first host OS 251 and a second host OS 252, are installed in the physical computer 10. As described later, the first host OS 251 and the second OS 252 are each allocated partial hardware resources, which are created by logically dividing hardware resources that are provided in the physical computer 10. A first partial VRAM 221, an NVRAM 130, and a power supply unit 150 are allocated as partial hardware resources to the first host OS 251 in FIG. 1.

In the example of FIG. 1, the first host OS 251 is a storage control OS configured to control processing of reading data from the external storage apparatus 20 and processing of writing data to the external storage apparatus 20, and the second host OS 252 is a virtual machine monitor (VMM) configured to control a plurality of virtual computers. The VMM generates a plurality of virtual machines (VMs) and runs guest OSes 400 on the generated VMs.

In the system configuration described above, a part of the storage area of the first partial VRAM 221 allocated to the first host OS 251 is secured as an HOS_VCM (a volatile cache memory for a host OS) 230 in order to improve data read and data write performance. In the case where server control OSes for a file server, a database server, and other similar servers are run as the guest OSes 400, a part of the storage area of a virtual VRAM 410, which is allocated to each guest OS 400, is secured as a GOS_VCM (a volatile cache memory for a guest OS) 420 in order to improve data read and data write performance.

In a case where a power cut is detected by the power supply unit 150 in this invention, the first host OS 251 backs up data that is stored in the HOS_VCM 230 to the NVRAM 130 as an HOS_NVCM (a non-volatile cache memory for a host OS) 710. The first host OS 251 also identifies the address of the GOS_VCM 420 in the physical address space, and backs up data that is stored in the GOS_VCM 420 to one of GOS_NVCMs 720 (non-volatile cache memories for guest OSes).

When the physical computer 10 recovers from a power failure and is rebooted in this invention, the first host OS 251 restores the data that is stored in the HOS_NVCM 710 to a newly secured HOS_VCM 230. The first host OS 251 also restores the data that is stored in the GOS_NVCM 720 to the GOS_VCM 420 on a newly allocated virtual VRAM 410 by cooperating with the second host OS 252 and the relevant guest OS 400.

First Embodiment

Figure 2:
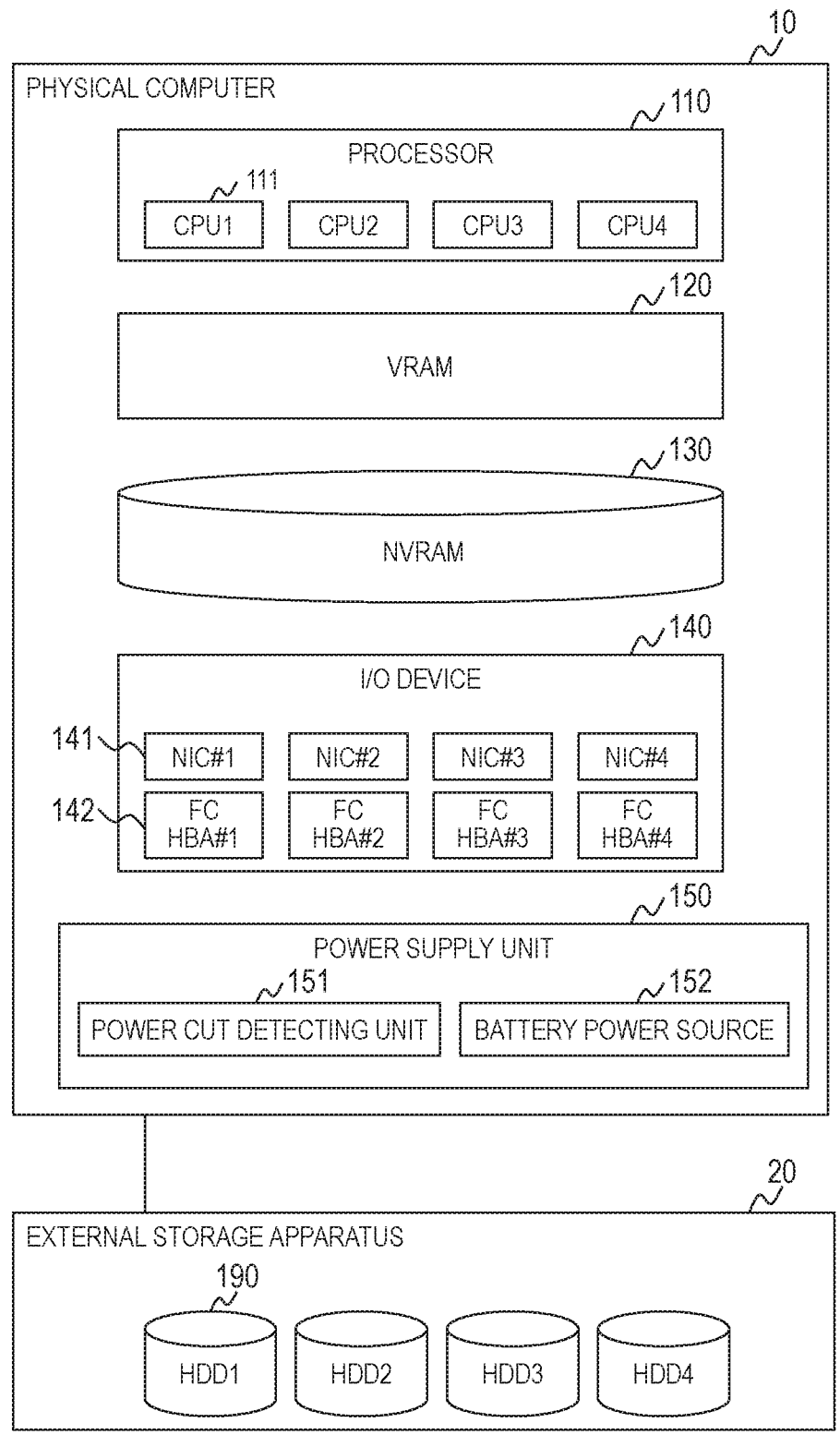
FIG. 2 is an explanatory diagram for illustrating an example of the physical hardware configuration of a computer system according to a first embodiment of this invention.

FIG. 2 is an explanatory diagram for illustrating an example of the physical hardware configuration of a computer system according to a first embodiment of this invention.

The computer system of this embodiment includes the physical computer 10 and the external storage apparatus 20. The physical computer 10 is coupled directly, or via a network, to the external storage apparatus 20. The network can be a SAN including a Fibre Channel (FC), or a similar network. The physical computer 10 may contain a storage apparatus therein.

The physical computer 10 include a processor 110, a volatile random access memory (VRAM) 120, the non-volatile random access memory (NVRAM) 130, an I/O device 140, and the power supply unit 150.

The processor 110 executes programs stored in the VRAM 120. The processor 110 includes a plurality of CPU cores 111. The functions of an OS and others are implemented by the processor 110 by executing the programs. When a description of processing given below has the processor 110 as the subject, it means that one of the stored programs is being executed by the processor 110.

The VRAM 120 is a storage medium including a volatile storage element. The VRAM 120 stores programs executed by the processor 110 and information necessary to execute the programs. The VRAM 120 also includes a work area of each program.

The NVRAM 130 is a storage medium including a non-volatile storage element. The NVRAM 130 stores, among others, program codes of various types of firmware running in the physical computer 10. The NVRAM 130 also includes a storage area in which data is temporarily stored when power is cut off unexpectedly. The storage capacity of the NVRAM 130 is smaller than that of the external storage apparatus but can be accessed at high speed from the physical computer 10. The NVRAM 130 can be, for example, a storage medium such as a solid state drive (SSD). While this embodiment uses the NVRAM 130 as a non-volatile storage medium, a non-volatile storage medium of a different type may be used instead.

The I/O device 140 is a device coupled to an external apparatus to receive input of information from the outside and to output information to the outside. The I/O device 140 can be, for example, an NIC and an FC HBA. Four NICs 141 and four FC HBAs 142 are illustrated as the I/O device 140 in FIG. 2. One NIC 141 or one FC HBA 142 serves as one I/O device 140.

The power supply unit 150 is configured to control power supply of the physical computer 10. The power supply unit 150 includes a power cut detecting unit 151 and a battery power source 152. The power cut detecting unit 151 monitors for an unexpected power cut and, when a power cut is detected, performs control so that power is fed from the battery power source 152.

The external storage apparatus 20 stores, among others, an OS program, program codes of various types of application software running on the OS, and data handled by the application software. In the case where the OS is of a type that supports page-in and page-out, the external storage apparatus 20 also provides a storage area to which data stored in the VRAM 120 is temporarily evacuated. The external storage apparatus 20 includes a plurality of storage media. The storage media can be, for example, hard disk drives (HDDs). The external storage apparatus 20 in FIG. 2 includes four HDDs 190 as storage media.

The physical computer 10 may instead be coupled to a storage system including a plurality of storage apparatus and a controller.

Figure 3:
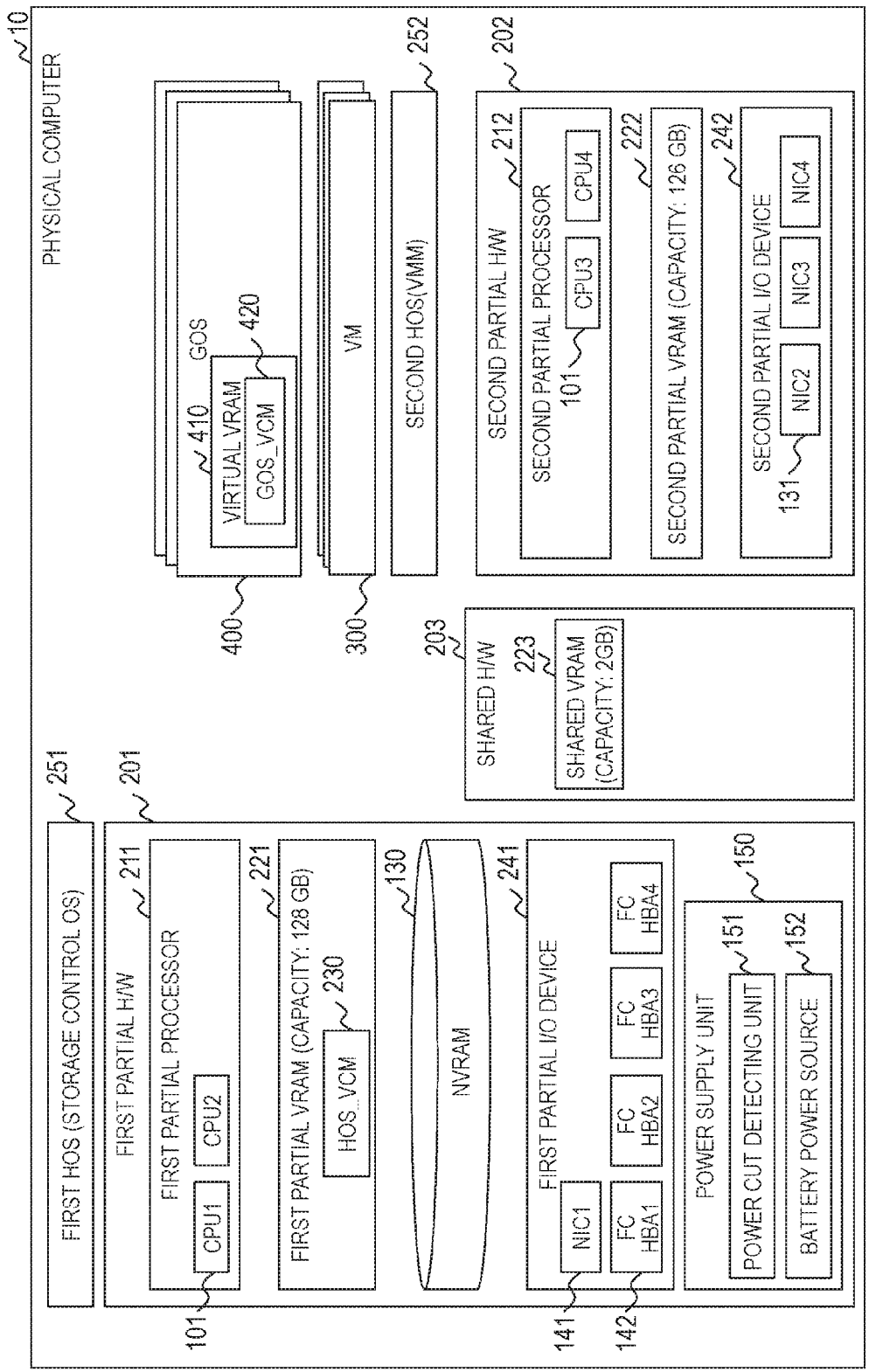
FIG. 3 is an explanatory diagram for illustrating an example of the logical configuration of the computer system according to the first embodiment of this invention.

FIG. 3 is an explanatory diagram for illustrating an example of the logical configuration of the computer system according to the first embodiment of this invention.

The computer system of this embodiment uses the multi-OS technology to logically divide the hardware of the physical computer 10 into three, namely, first partial hardware (H/W) 201, second partial hardware (H/W) 202, and shared hardware (H/W) 203.

The first host OS 251 is booted up on the first partial H/W 201, and the second host OS 252 is booted up on the second partial H/W 202. The first partial H/W 201 is used exclusively by the first host OS 251, and the second partial H/W 202 is used exclusively by the second host OS 252.

The first partial H/W 201 includes a first partial processor 211, the first partial VRAM 221, the NVRAM 130, a first partial I/O device 241, and the power supply unit 150.

The first partial processor 211 is a logical processor to which two CPU cores 111 are allocated out of four CPU cores 111 that are included in the processor 110. The first partial VRAM 221 is a logical VRAM to which a part of the storage area of the VRAM 120 is allocated. As illustrated in FIG. 2, a part of the storage area of the first partial VRAM 221 is secured as the HOS_VCM 230.

Control is exerted so that the CPU cores 111 allocated to the first partial processor 211 and the storage area allocated to the first partial VRAM 221 are not used by the second host OS 252, which runs on the second partial H/W 202. For instance, the storage area allocated to the first partial VRAM 221 is not mapped onto the host virtual address (HVA) space of the second host OS 252.

Some of the I/O devices 140 included in the physical computer 10 are allocated as the first partial I/O device 241. The NVRAM 130 and the power supply unit 150 are allocated exclusively to the first partial H/W 201.

The second partial H/W 202 includes a second partial processor 212, a second partial VRAM 222, and a second partial I/O device 242.

The second partial processor 212 is a logical processor to which two CPU cores 111 are allocated out of the four CPU cores 111 that are included in the processor 110. The second partial VRAM 222 is a logical VRAM to which a part of the storage area of the VRAM 120 is allocated. Some of the I/O devices 140 included in the physical computer 10 are allocated as the second partial I/O device 242.

The shared H/W 203 is hardware that can be used by the first host OS 251 and the second host OS 252 both. The shared H/W 203 in this embodiment includes a shared VRAM 223 to which a part of the storage area of the VRAM 120 is allocated. The storage area allocated to the shared VRAM 223 is mapped onto the HVA space of the first host OS 251 and the HVA space of the second host OS 252. In other words, the first host OS 251 and the second host OS 252 can each access the shared VRAM 223.

The first host OS 251 in this embodiment serves as a storage control OS. The storage control OS controls processing of reading data from the external storage apparatus 20 and processing of writing data to the external storage apparatus 20.

The first host OS 251 has a function of managing address spaces of a memory that general OSes have, and manages mapping between the host physical address (HPA) space and HVA space of the first partial VRAM 221. The HPA space of the first partial VRAM 221 is an address space that indicates the physical location of the first partial VRAM 221 that is managed by the first host OS 251. The HVA space of the first partial VRAM 221 is an address space that indicates the location of a virtual memory that is allocated by the first host OS 251 to application software or the like.

The first host OS 251 in this embodiment also executes processing of backing up data and processing of restoring data between a VCM and an NVCM. In the following description, processing of backing up data and processing of restoring data between a VCM and an NVCM may simply be referred to also as "backup processing" and "restoration processing".

The second host OS 252 in this embodiment serves as a VMM. The VMM uses the virtual machine technology to allocate part of the second partial H/W 202, thereby generating a plurality of VMs 300, and runs the guest OSes 400 on the respective VMs 300 generated.

The VMM manages mapping between the guest physical address (GPA) spaces of the virtual VRAMs 410 allocated to the VMs 300 and the HPA space of the second partial VRAM 222. The GPA spaces of the virtual VRAMs 410 are address spaces that indicate the physical locations of the virtual VRAMs 410 that are managed by the guest OSes 400. The HPA space of the second partial VRAM 222 is an address space that indicates the physical location of the second partial VRAM 222 that is managed by the second host OS 252.

The VMs 300 on which the guest OSes 400 run are allocated the virtual VRAMs 410. The guest OSes 400 are allocated virtual processors and virtual I/O devices (not shown).

The guest OSes 400 recognize the virtual VRAMs 410 as physical VRAMs. Each guest OS 400 has a function of managing address spaces of a memory that general OSes have, and manages mapping between the GPA space and guest virtual address (GVA) space of its allocated virtual VRAM 410. The GVA space of the virtual VRAM 410 is an address space that indicates the location of a virtual memory that is allocated by its guest OS 400 to application software or the like.

Figure 4A:
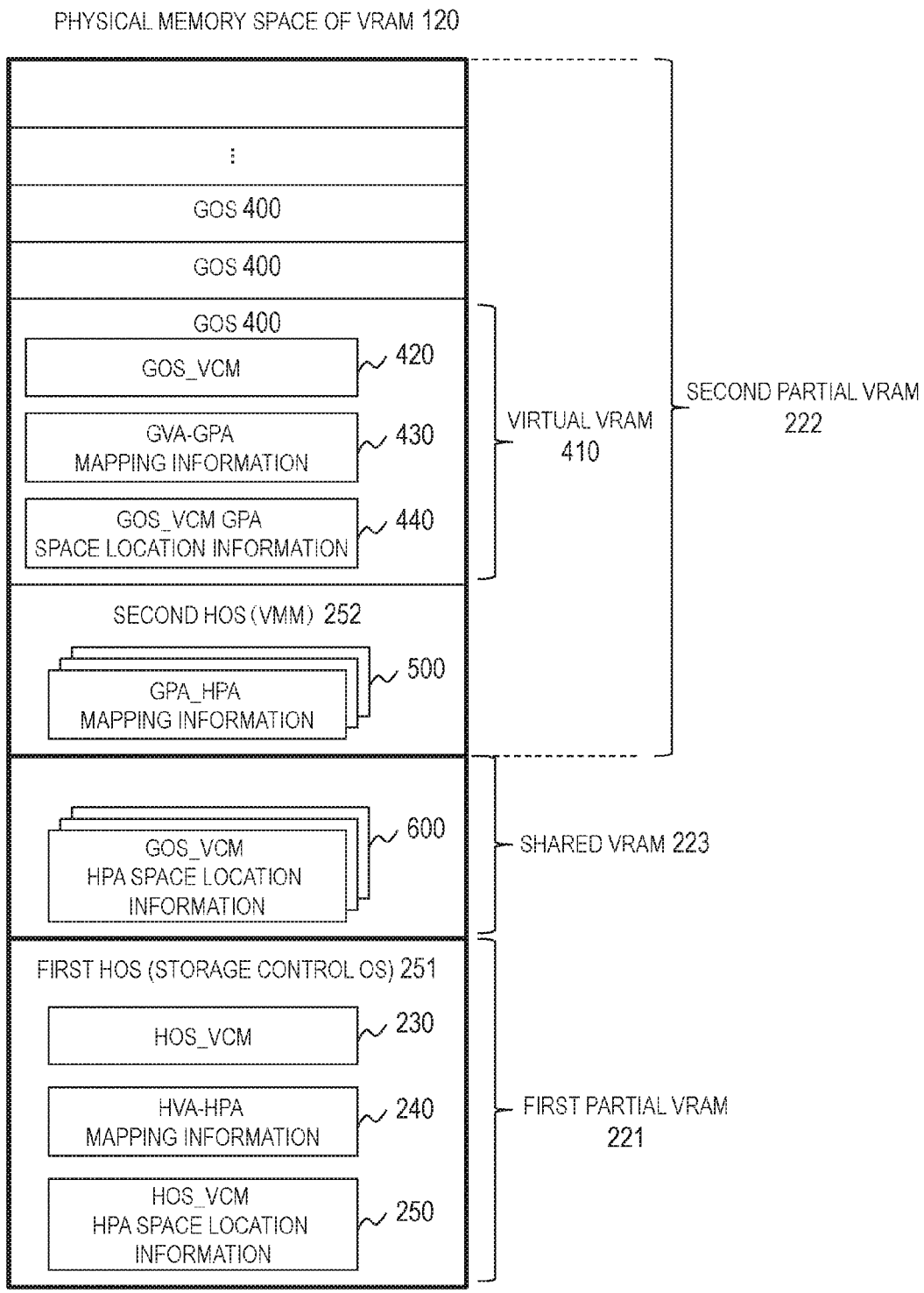
FIG. 4A is an explanatory diagram for illustrating information that is stored in a VRAM of the first embodiment of this invention.
Figures 4B, 5:
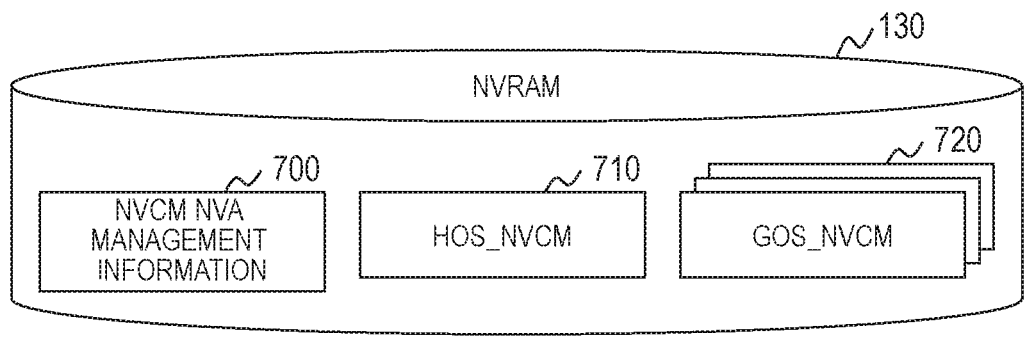
FIG. 4B is an explanatory diagram for illustrating information that is stored in a NVRAM of the first embodiment of this invention.
FIG. 5 is an explanatory diagram for showing an example of GPA-HPA mapping information according to the first embodiment of this invention.

FIG. 4A is an explanatory diagram for illustrating information that is stored in the VRAM 120 of the first embodiment of this invention. FIG. 4B is an explanatory diagram for illustrating information that is stored in the NVRAM 130 of the first embodiment of this invention. The description given here focuses on information necessary for backup processing and restoration processing.

The physical address space of the VRAM 120 is logically divided into three storage areas, namely, a storage area allocated to the first partial VRAM 221, a storage area allocated to the second partial VRAM 222, and a storage area allocated to the shared VRAM 223. The physical address space of the VRAM 120 in FIG. 4 is divided into three storage areas each having consecutive addresses. However, the method for division is not limited thereto.

The first partial VRAM 221 is managed by the first host OS 251. The first host OS 251 secures a part of the storage area of the first partial VRAM 221 as the HOS_VCM 230. The first partial VRAM 221 stores, as information necessary for backup processing and restoration processing, HVA-HPA mapping information 240 and HOS_VCM HPA space location information 250.

The HVA-HPA mapping information 240 is information for managing mapping between an HPA space and an HVA space that are managed by the first host OS 251. The HVA-HPA mapping information 240 is generated by the first host OS 251. The HVA-HPA mapping information 240 corresponds to what is generally called a page table. An HPA is the physical address of the first partial VRAM 221. An HVA is a virtual address used by the first host OS 251 and by application software that runs on the first host OS 251.

The HOS_VCM HPA space location information 250 is information that indicates the location of the HOS_VCM 230 in an HPA space that is managed by the first host OS 251. The HOS_VCM HPA space location information 250 is generated by the first host OS 251. The HOS_VCM 230 is usually allocated a plurality of storage areas having non-consecutive physical addresses. The HOS_VCM HPA space location information 250 therefore includes a plurality of entries in each of which the physical head address of one of the storage areas allocated to the HOS_VCM 230 is associated with the size of this storage area.

The second host OS 252 locates itself in a part of the storage area of the second partial VRAM 222. The second host OS 252 allocates a part of the second partial VRAM 222 as the virtual VRAMs 410 to the VMs 300.

The storage area in which the second host OS 252 is located stores pieces of GPA-HPA mapping information 500 as information necessary for backup processing and restoration processing.

The GPA-HPA mapping information 500 is information for managing mapping between the GPA spaces managed by the guest OSes 400 and an HPA space that is managed by the second host OS 252. The GPA-HPA mapping information 500 is generated by the second host OS 252. The GPA-HPA mapping information 500 corresponds to what is called an extended page table (EPT) in the case where the second host OS 252 (VMM) uses the Intel VT-x technology. GPAs are the physical addresses of the virtual VRAMs 410, which are recognized as physical VRAMs by the VMs 300. The GPA-HPA mapping information 500 is described later with reference to FIG. 5.

A part of the storage area of each virtual VRAM 410 is secured as the GOS_VCM 420. Each virtual VRAM 410 stores GVA-GPA mapping information 430 and GOS_VCM GPA space location information 440 as information necessary for backup processing and restoration processing.

The GVA-GPA mapping information 430 is information for managing mapping between a GVA space and a GPA space that are managed by the relevant guest OS 400. The GVA-GPA mapping information 430 is generated by the guest OS 400. The GVA-GPA mapping information 430 is, as is the HVA-HPA mapping information 240, what is generally called a page table. A GVA is a virtual address used by the guest OS 400 and by application software that runs on the guest OS 400. The GVA-GPA mapping information 430 is described later with reference to FIG. 6.

The GOS_VCM GPA space location information 440 is information that indicates the location of the GOS_VCM 420 in a GPA space that is managed by the relevant guest OS 400. The GOS_VCM GPA space location information 440 is generated by the guest OS 400. The GOS_VCM GPA space location information 440 is described later with reference to FIG. 7.

The shared VRAM 223 stores pieces of GOS_VCM HPA space location information 600 as information necessary for backup processing and restoration processing. Each piece of GOS_VCM HPA space location information 600 is information that indicates the location of one GOS_VCMs 420 in an HPA space that is managed by the second host OS 252. The GOS_VCM HPA space location information 600 is generated by the second host OS 252. The GOS_VCM HPA space location information 600 is described later with reference to FIG. 8.

Parts of the storage area of the NVRAM 130 are secured as the HOS_NVCM 710 and the GOS_NVCMs 720. The NVRAM 130 stores NVCM NVA management information 700 as information necessary for backup processing and restoration processing.

The NVCM NVA management information 700 is information for managing the addresses (NVAs) of the parts of the storage area of the NVRAM 130 that are secured as the HOS_NVCM 710 and the GOS_NVCMs 720. The NVCM NVA management information 700 is described later with reference to FIG. 9.

FIG. 5 is an explanatory diagram for showing an example of the GPA-HPA mapping information 500 according to the first embodiment of this invention.

In each piece of the GPA-HPA mapping information 500, one entry is registered for one storage area (for example, a page) in a GPA space that is managed by the relevant guest OS 400. Each entry registered in the GPA-HPA mapping information 500 includes a GPA 501, an HPA 502, and a size 503.

The GPA 501 is the head address of the one storage area in the GPA space. The HPA 502 is the head address of the one storage area in the relevant HPA space which is assigned to the storage area indicated by the GPA 501. The size 503 is the size of the one storage area indicated by the GPA 501.

FIG. 6 is an explanatory diagram for showing an example of the GVA-GPA mapping information 430 according to the first embodiment of this invention.

In each piece of the GVA-GPA mapping information 430, one entry is registered for one storage area (for example, a page) in a GVA space that is managed by the relevant guest OS 400. Each entry registered in the GVA-GPA mapping information 430 includes a GVA 431, a GPA 432, and a size 433.

The GVA 431 is the head address of the one storage area in the GVA space. The GPA 432 is the head address of the one storage area in the relevant GPA space which is assigned to the storage area indicated by the GVA 431. The size 433 is the size of the one storage area indicated by the GVA 431.

FIG. 7 is an explanatory diagram for showing an example of the GOS_VCM GPA space location information 440 according to the first embodiment of this invention.

In each piece of GOS_VCM GPA space location information 440, one entry is registered for one storage area group (for example, a block) that forms the relevant GOS_VCM 420. A storage area group means a plurality of storage areas (pages) having consecutive addresses. Each entry registered in the GOS_VCM GPA space location information 440 includes an ID 441, a GPA 442, and a size 443.

The ID 441 is an identifier for uniquely identifying an entry that is registered in this piece of GOS_VCM GPA space location information 440. The GPA 442 is the head address of one storage area group that forms the relevant GOS_VCM 420 in a GPA space that is managed by the relevant guest OS 400. The size 443 is the size of the one storage area group indicated by the GPA 442.

FIG. 8 is an explanatory diagram for showing an example of the GOS_VCM HPA space location information 600 according to the first embodiment of this invention.

In each piece of GOS_VCM HPA space location information 600, one entry is registered for one storage area group (for example, a block) that forms the relevant GOS- _VCM 420. Each entry registered in the GOS_VCM HPA space location information 600 includes an ID 601, an HPA 602, and a size 603.

The ID 601 is an identifier for uniquely identifying an entry that is registered in this piece of GOS_VCM HPA space location information 600. The HPA 602 is the head address of one storage area group that forms the relevant GOS_VCM 420 in an HPA space that is managed by the VMM. The size 603 is the size of the one storage area group indicated by the HPA 602.

FIG. 9 is an explanatory diagram for showing an example of the NVCM NVA management information 700 according to the first embodiment of this invention.

In the NVCM NVA management information 700, one entry is registered for the HOS_NVCM 710 or for each GOS_NVCM 720. Each entry registered in the NVCM NVA management information 700 includes an OS_ID 701, an NVA 702, and a size 703.

The OS_ID 701 is an identifier for uniquely identifying an entry registered in the NVCM NVA management information 700. The NVA 702 is the head address of a storage area that corresponds to the HOS_NVCM 710 or to the relevant GOS_NVCM 720. The size 703 is the size of the storage area indicated by the NVA 702.

Figure 10:
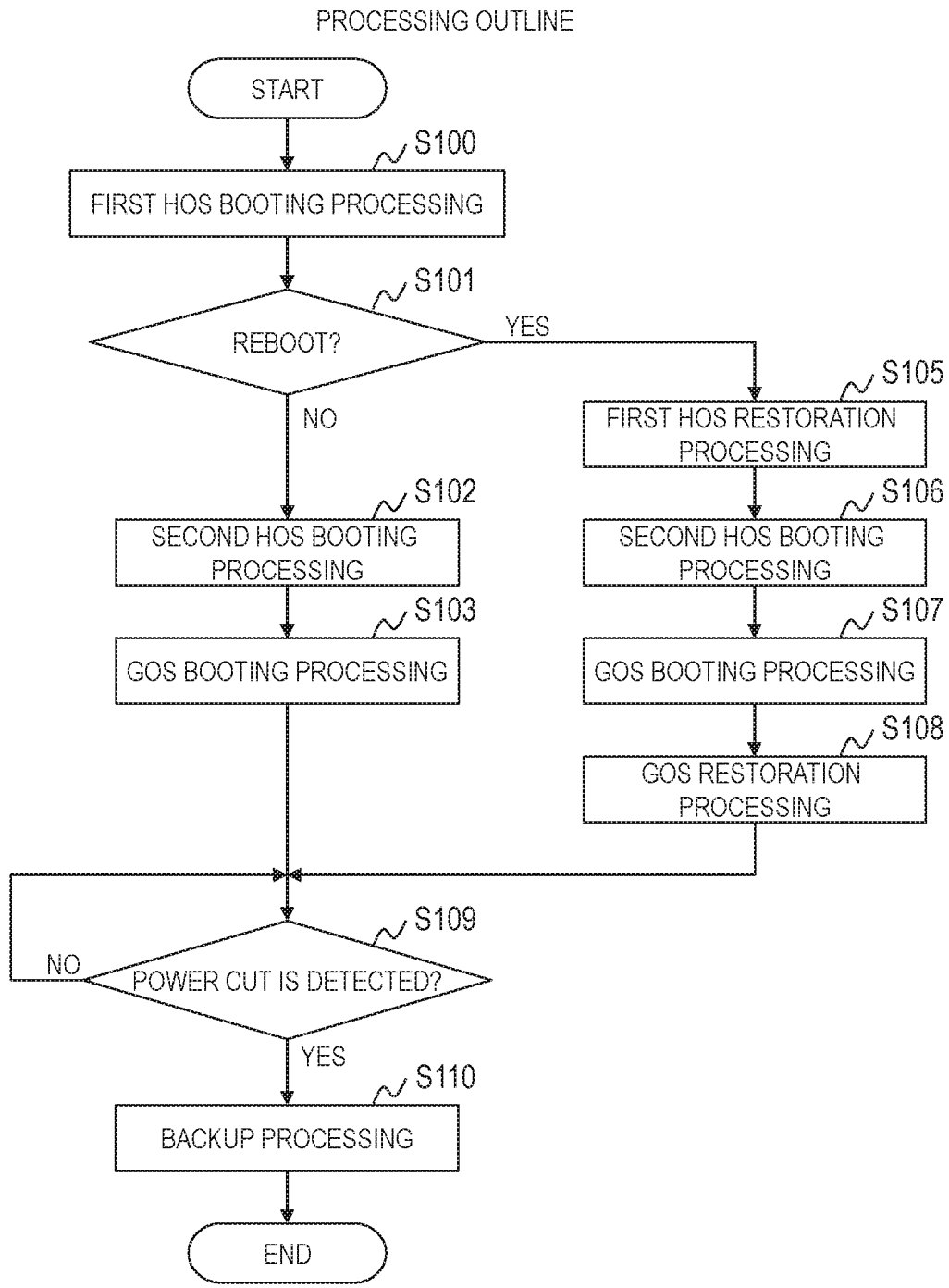
FIG. 10 is a flow chart for illustrating the outline of booting processing of the computer system according to the first embodiment of this invention.

FIG. 10 is a flow chart for illustrating the outline of booting processing of the computer system according to the first embodiment of this invention.

When the physical computer 10 is powered on, processing of booting up the first host OS 251 is started first (Step S100). Specifically, the following processing is executed.

After the power is on, one of the CPU cores 111 reads a boot loader from the external storage apparatus 20 or other places, and loads the boot loader onto the first partial VRAM 221. The CPU core 111 further executes the loaded boot loader.

The boot loader sets the shared VRAM 223 in the VRAM 120 based on resource definition information (not shown), which is set in advance, and writes the resource definition information to the shared VRAM 223.

The boot loader writes an image of the first host OS 251 based on the resource definition information to the first partial VRAM 221 to boot up the first host OS 251. The first host OS 251 is subsequently booted up based on the resource definition information with the use of the first partial H/W 201. Details of the processing of booting up the first host OS 251 are described later with reference to FIG. 11.

The method of booting up the first host OS 251 is not limited thereto and other known methods may be used for the booting. Step S100 has now been described.

Next, the first host OS 251 determines whether or not the processing being executed is reboot processing following a power cut (Step S101).

The method of enabling the first host OS 251 to make the determination is, for example, to set information indicating the detection of a power cut in the NVRAM 130 in a case where the power supply unit 150 detects the power cut. The first host OS 251 in this case determines whether or not this information has been set in the NVRAM 130. The described determination method is an example and this invention is not limited thereto. For instance, the first host OS 251 may determine that the processing being executed is reboot processing following a power cut in a case where there is backup data stored in the HOS_NVCM 710 of the NVRAM 130.

In a case where it is determined that the processing being executed is not reboot processing following a power cut, the first host OS 251 starts processing of booting up the second host OS 252 (Step S102).

Specifically, the first host OS 251 writes an image of the second host OS 252 to the second partial VRAM 222 based on the resource definition information to boot up the second host OS 252. The second host OS 252 is subsequently booted up based on the resource definition information with the use of the second partial H/W 202. Details of the processing of booting up the second host OS 252 are described later with reference to FIG. 12.

Next, the second host OS 252 starts processing of booting up the guest OSes 400 (Step S103). Details of the processing of booting up the guest OSes 400 are described later with reference to FIG. 13.

After the processing of booting up the guest OSes 400 is completed, the first host OS 251 executes normal business operation and starts power supply monitoring processing as well. The first host OS 251 determines whether or not a power cut has been detected (Step S109).

In the case where no power cut has been detected, the first host OS 251 continues the power supply monitoring processing. In the case where a power cut has been detected, on the other hand, the first host OS 251 starts backup processing (Step S110). After the backup processing is completed, the first host OS 251 stops the feeding of power to the physical computer 10. Details of the backup processing are described later with reference to FIG. 15.

In a case where it is determined in Step S101 that the processing being executed is reboot processing following a power cut, the first host OS 251 executes restoration processing of the first host OS 251 (Step S105).

Specifically, the first host OS 251 restores data that is stored in the HOS_NVCM 710 to the first partial VRAM 221 based on the NVCM NVA management information 700 and newly generated HOS_VCM HPA space location information 250. The restoration processing of the first host OS 251 is described later with reference to FIG. 16.

Next, the first host OS 251 starts processing of booting up the second host OS 252 (Step S106). Step S106 is the same as Step S102.

Next, the second host OS 252 starts processing of booting up the guest OSes 400 (Step S107). Step S107 is the same as Step S103.

The guest OSes 400 detect that the guest OSes 400 have been rebooted, and execute restoration processing of the guest OSes 400 in cooperation with the first host OS 251 and the second host OS 252 (Step S108). After the restoration processing of the guest OSes 400 is completed, the first host OS 251 executes normal business operation and starts power supply monitoring processing as well. The first host OS 251 determines whether or not a power cut has been detected (Step S109). A description on the steps subsequent to Step S109 which have already been described is omitted here.

In the restoration processing of the guest OSes 400, pieces of data stored in the GOS_NVCMs 720 are restored to the virtual VRAMs 410. The restoration processing of the guest OSes 400 is described later with reference to FIG. 17A, FIG. 17B, and FIG. 17C.

The reboot of the guest OSes 400 can be detected as follows. The guest OS 400 that is booted up accesses the relevant GOS_NVCM 720 after the boot to determine whether or not data is stored in this GOS_NVCM 720. The guest OS 400 determines that this booting of the guest OS 400 is reboot in a case where there is data stored in the GOS_NVCM 720.

In another method of reboot detection, the guest OS 400 that is shut down obtains a log for identifying the cause during the shutdown and, after booted up, determines whether or not this booting of the guest OS 400 is reboot based on the log. In still another possible method, the second host OS 252 notifies the reboot of the guest OSes 400 after the guest OSes 400 are rebooted in the processing of booting up the guest OSes 400. The determination methods described above are examples, and this invention is not limited thereto.

Figure 11:
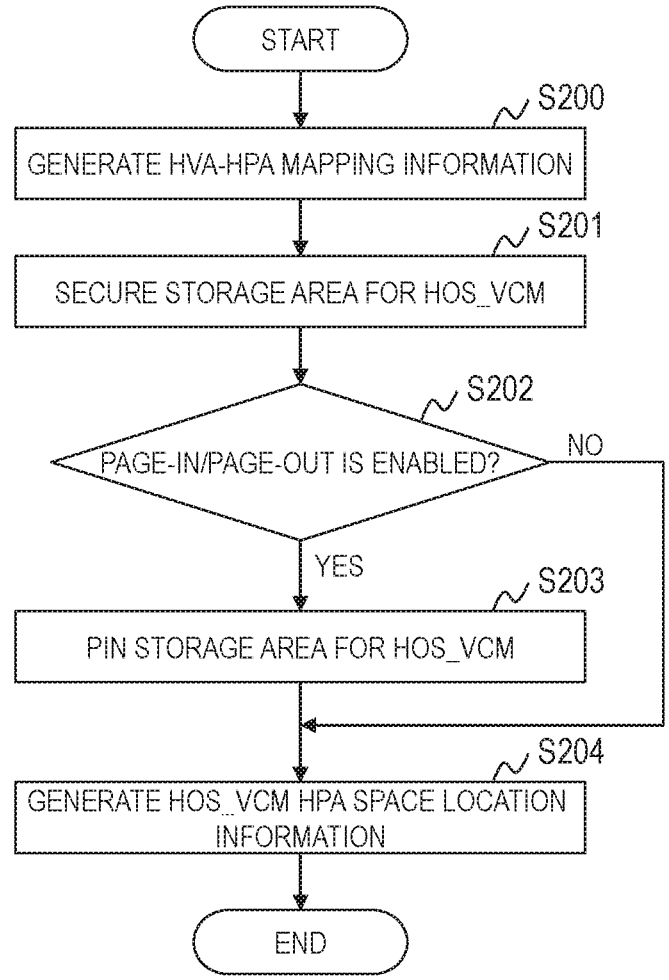
FIG. 11 is a flow chart for illustrating details of processing of booting up a first host OS according to the first embodiment of this invention.

FIG. 11 is a flow chart for illustrating details of the processing of booting up the first host OS 251 according to the first embodiment of this invention. The first host OS 251 uses the first partial processor 211 to execute the processing of booting up the first host OS 251.

The first host OS 251 generates the HVA-HPA mapping information 240 (Step S200). The HVA-HPA mapping information 240 is generated by a known method, and a description on the method is therefore omitted.

The first host OS 251 secures a storage area for the HOS_VCM on the first partial VRAM 221 (Step S201). Specifically, the first host OS 251 secures a storage area having consecutive addresses in its HVA space as a storage area for the HOS_VCM.

The first host OS 251 determines whether or not page-in and page-out are enabled (Step S202).

In a case where it is determined that page-in and page-out are not enabled, the first host OS 251 proceeds to Step S204.

In a case where it is determined that page-in and page-out are enabled, the first host OS 251 pins the storage area secured for the HOS_VCM in order to prevent data stored in this storage area from being cleared out of swap files (Step S203).

The first host OS 251 generates the HOS_VCM HPA space location information 250 (Step S204), and ends the processing of FIG. 11. Specifically, the following processing is executed.

The first host OS 251 searches the HVA-HPA mapping information 240 for the HVA of the storage area secured for the HOS_VCM, and identifies a plurality of storage area groups in the HPA space that form the storage area secured for the HOS_VCM.

The first host OS 251 adds entries for the identified storage area groups to the HOS_VCM HPA space location information 250. In each added entry, the first host OS 251 sets the head address (HPA) and size of the entry's storage area group.

The first host OS 251 sorts the entries of the HOS_VCM HPA space location information 250 by the HVAs of the plurality of storage area groups. The first host OS 251 sorts the entries in, for example, ascending or descending order of HVA.

The first host OS 251 assigns ascending IDs from top entries of the HOS_VCM HPA space location information 250 downwards. The same information as the GOS_VCM HPA space location information 600 is generated in this manner. Step S204 has now been described.

Figure 12:
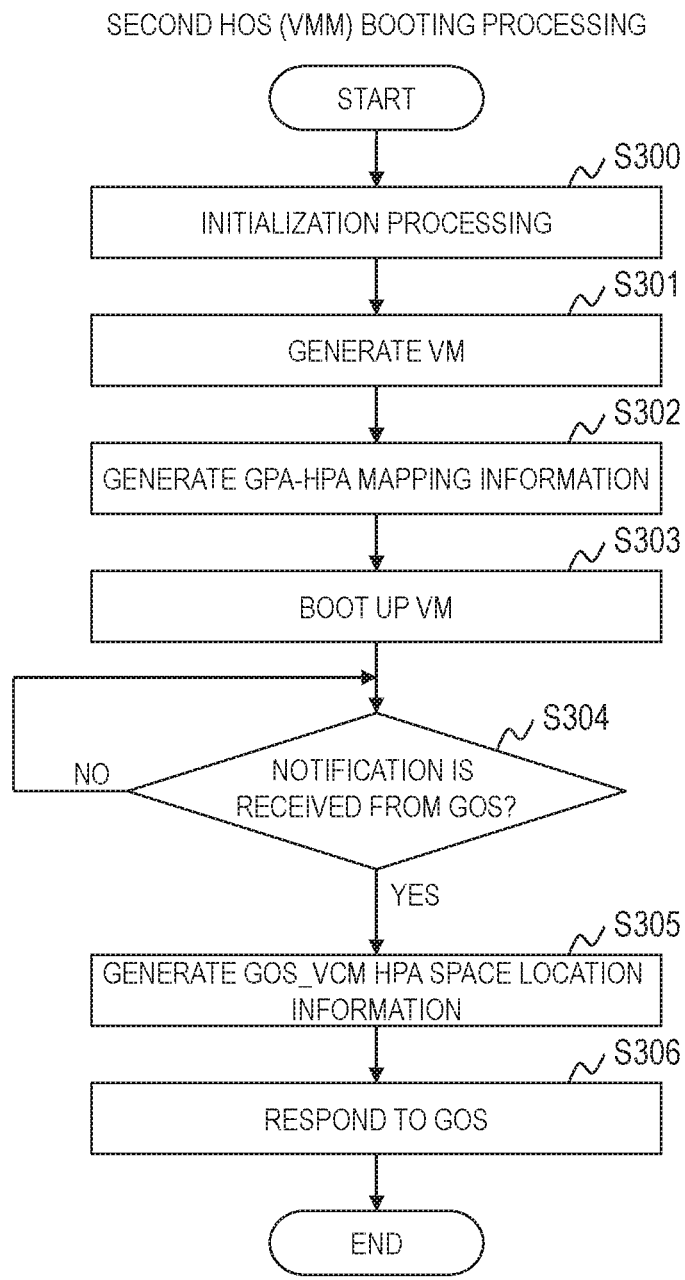
FIG. 12 is a flow chart for illustrating details of processing of booting up a second host OS according to the first embodiment of this invention.

FIG. 12 is a flow chart for illustrating details of the processing of booting up the second host OS 252 according to the first embodiment of this invention. The second host OS 252 uses the second partial processor 212 to execute the processing of booting up the second host OS 252.

The second host OS 252 first executes initialization processing (Step S300). The VMM initialization processing is known processing, and a description thereof is omitted here. After the initialization processing is completed, the second host OS 252 generates the VMs 300 (Step S301). Processing of generating the VMs is known processing, and a description there of is omitted here.

The second host OS 252 generates the GPA-HPA mapping information 500 for each VM 300 generated (Step S302). Processing of generating the GPA-HPA mapping information 500 is known processing, and a description thereof is omitted. The second host OS 252 manages the GPA-HPA mapping information 500 of one VM 300 in association with identification information of the VM 300.

The second host OS 252 boots up the VMs 300 (Step S303). The booted up VMs 300 start the processing of booting up the guest OSes 400. The processing of booting up the guest OSes 400 is described later with reference to FIG. 13.

The second host OS 252 determines for each guest OS 400 whether or not a notification of where the GOS_VCM GPA space location information 440 is stored has been received from the guest OS 400 (Step S304).

In a case where it is determined that the notification has not been received from the guest OS 400, the second host OS 252 keeps waiting until the notification is received from the guest OS 400.

In a case where it is determined that the notification has been received from the guest OS 400, the second host OS 252 generates the GOS_VCM HPA space location information 600 for the relevant VM 300 (Step S305). Specifically, the following processing is executed.

The second host OS 252 searches the GPA-HPA mapping information 500 for a GPA that is included in the notification received from the guest OS 400, and reads the GOS_VCM GPA space location information 440 that is stored in the relevant virtual VRAM 410. The second host OS 252 selects one entry from the GOS_VCM GPA space location information 440. In this case, the entries are selected in ascending order of the ID 441.

The second host OS 252 searches the GPA-HPA mapping information 500 for entries in which the GPA 501 matches the GPA 442 of the selected entry. In other words, the addresses of storage areas that form the relevant GOS_VCM 420 in an HPA space that is managed by the second host OS 252 are identified.

The second host OS 252 generates entries in the GOS_VCM HPA space location information 600, and sets identification numbers in ascending order to the generated entries as the ID 601. In the generated entries, the second host OS 252 also sets, as the HPA 602, addresses that are stored as the HPA 502 in the found entries and sets, as the size 603, a value that is stored as the size 443 in the selected entry.

The same processing is subsequently executed for every entry of the GOS_VCM GPA space location information 440. The GOS_VCM HPA space location information 600 for the VM 300 is generated in this manner. Step S305 has now been described.

The second host OS 252 next transmits a response to the notification issued by the guest OS 400 to this guest OS 400 (Step S306), and ends the processing of FIG. 12. In the case where the second host OS 252 boots up a plurality of guest OSes 400, Step S301 to Step S305 are executed repeatedly to process one guest OS 400 at a time.

Figure 13:
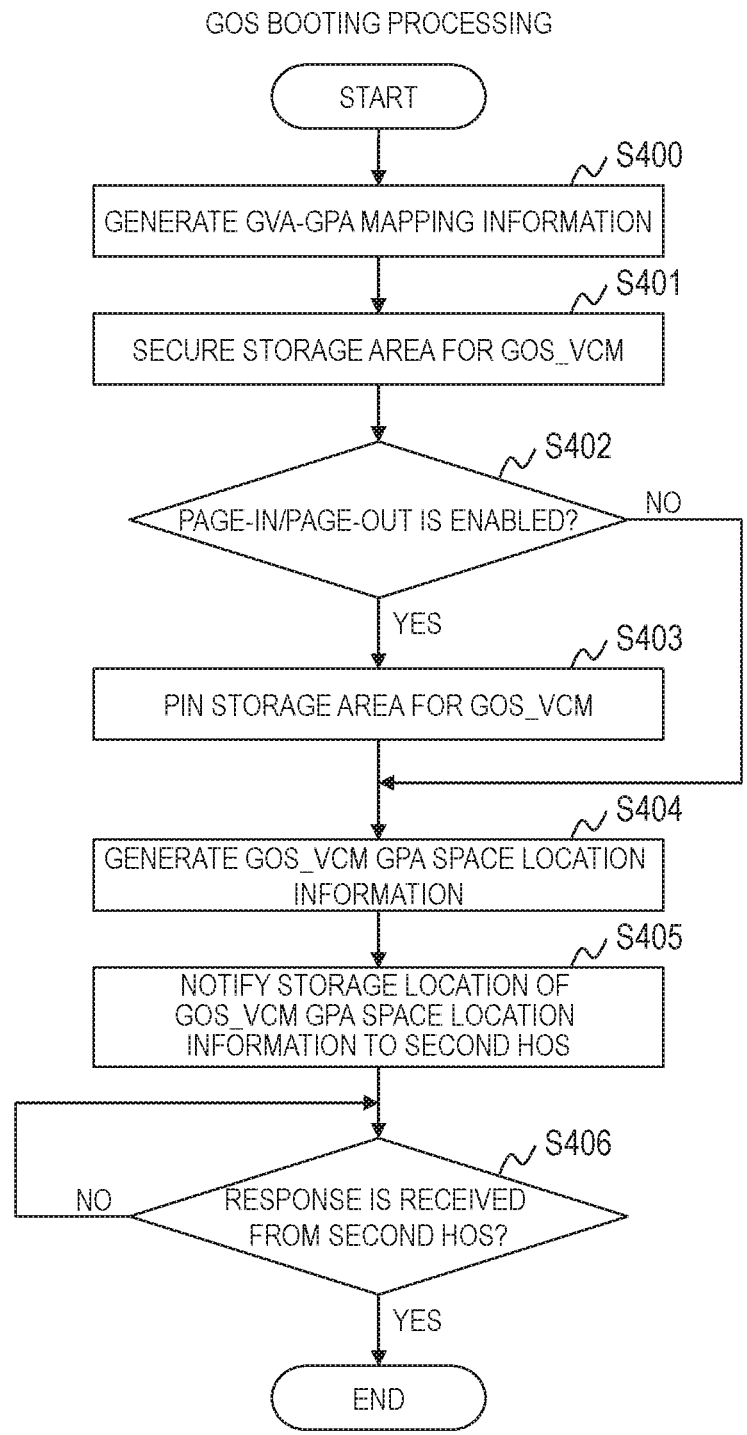
FIG. 13 is a flow chart for illustrating an example of processing of booting up guest OSes according to the first embodiment of this invention.

FIG. 13 is a flow chart for illustrating an example of the processing of booting up the guest OSes 400 according to the first embodiment of this invention.

The guest OS 400 to be booted up generates the GVA-GPA mapping information 430 (Step S400). The GVA-GPA mapping information 430 is generated by a known method, and a description on the method is therefore omitted.

The guest OS 400 secures a storage area for the GOS_VCM on the virtual VRAM 410 (Step S401). Specifically, the guest OS 400 secures a storage area having consecutive addresses in its GVA space as a storage area for the GOS_VCM.

The guest OS 400 determines whether or not page-in and page-out are enabled (Step S402).

In a case where it is determined that page-in and page-out are not enabled, the guest OS 400 proceeds to Step S404.

In a case where it is determined that page-in and page-out are enabled, the guest OS 400 pins the storage area secured for the GOS_VCM 420 in order to prevent data stored in this storage area from being cleared out of swap files (Step S403).

The guest OS 400 generates the GOS_VCM GPA space location information 440 (Step S404), and transmits to the second host OS 252 a notification for notifying the second host OS 252 of the storage location of the GOS_VCM GPA space location information 440 generated (Step S405). Specifically, the following processing is executed.

The guest OS 400 searches the GVA-GPA mapping information 430 for the GVA of the storage area secured for the GOS_VCM, and identifies a plurality of storage area groups in the relevant GPA space that form the storage area secured for the GOS_VCM.

The guest OS 400 adds entries for the identified storage area groups to the GOS_VCM GPA space location information 440. In each added entry, the guest OS 400 sets the head address (GPA) and size of the entry's storage area group as the GPA 442 and the size 443.

The guest OS 400 sorts the plurality of entries of the GOS_VCM GPA space location information 440 by the GPA 442. For instance, the guest OS 400 sorts the entries in the ascending or descending order of GPA.

The guest OS 400 assigns ascending IDs from top entries of the GOS_VCM GPA space location information 440 downwards. The GOS_VCM HPA space location information 600 is generated in this manner. The guest OS 400 notifies the second host OS 252 of an address (GPA) in the GPA space at which the GOS_VCM HPA space location information 600 is stored. Step S404 and Step S405 have now been described.

The guest OS 400 determines whether or not a response has been received from the second host OS 252 (Step S406).

In a case where it is determined that no response has been received from the second host OS 252, the guest OS 400 keeps waiting until a response is received from the second host OS 252. In a case where it is determined that a response has been received from the second host OS 252, on the other hand, the guest OS ends the processing of FIG. 13. The guest OS 400 executes normal processing from then on.

Figure 14:
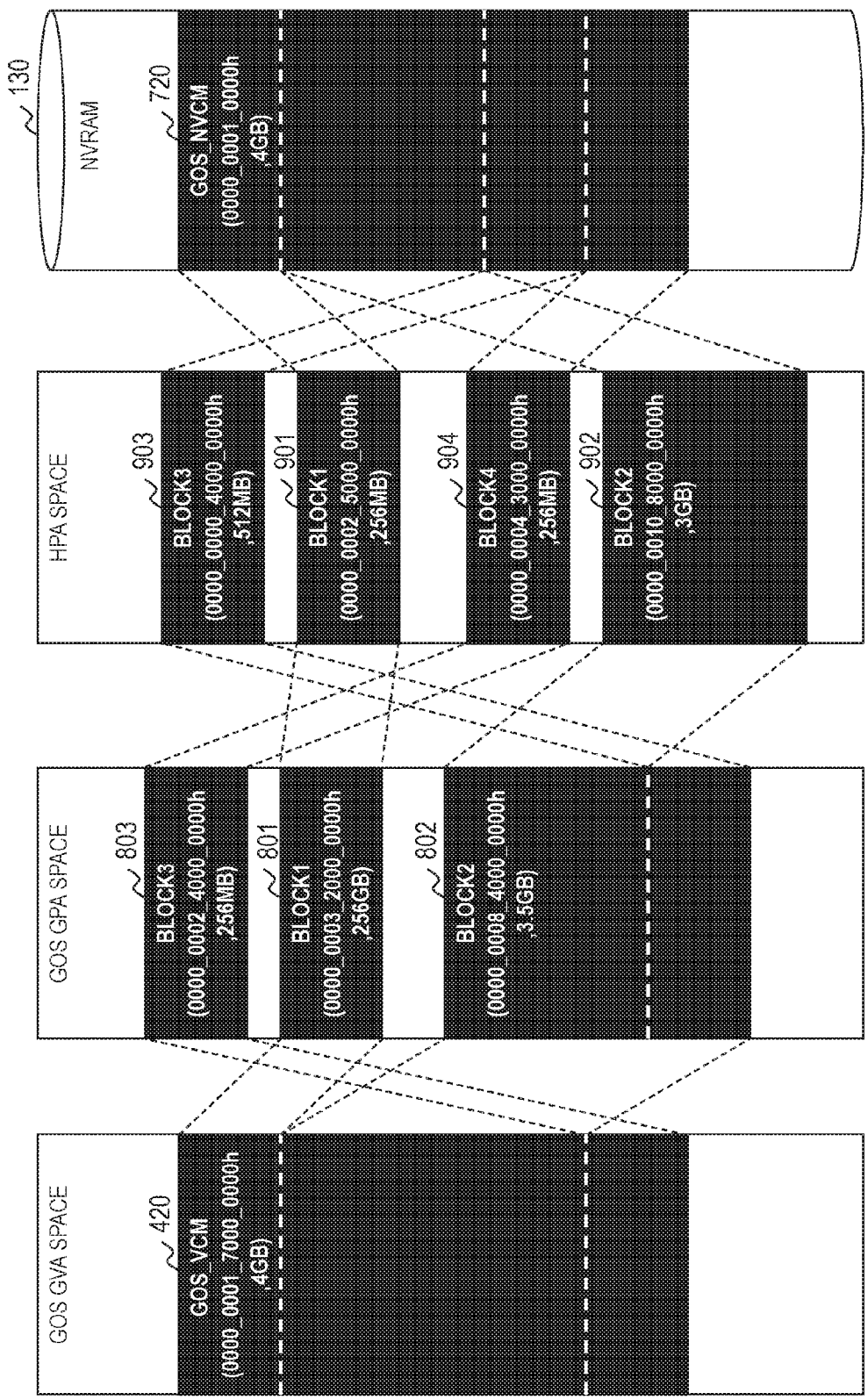
FIG. 14 is an explanatory diagram for illustrating an example of the location of one GOS_VCM in a GVA space, in a GPA space, and in an HPA space according to the first embodiment of this invention.

Technical features of the GOS_VCM GPA space location info' nation 440 and the GOS_VCM HPA space location information 600 are described with reference to FIG. 14. FIG. 14 is an explanatory diagram for illustrating an example of the location of one GOS_VCM 420 in a GVA space, in a GPA space, and in an HPA space according to the first embodiment of this invention.

(1) As described above with reference to FIG. 11 to FIG. 13, the first host OS 251 generates mapping between an HPA space and an HVA space every time the first host OS 251 is booted up, and secures a storage area having consecutive addresses in the HVA space as a storage area to be allocated to the HOS_VCM 230. Each guest OS 400 generates mapping between a GPA space and a GVA space every time the guest OS 400 is booted up, and secures a storage area having consecutive addresses in the GVA space as a storage area to be allocated to its GOS_VCM 420.

As described above, the mapping relation between an HPA space and an HVA space and the mapping relation between a GPA space and a GVA space are likely to change each time the physical computer 10 is booted up. It is therefore a possibility that a different storage area in the HPA space than before is allocated to the HOS_VCM 230, and that a different storage area in the GPA space than before is allocated to the GOS_VCM 420 in question.

This makes it necessary for the first host OS 251 to know the location of the HOS_VCM 230 in an HPA space managed by the first host OS 251 and the location of the GOS_VCM 420 in an HPA space managed by the second host OS 252, in order to back up data stored in the HOS_VCM 230 and data stored in the GOS_VCM 420 at high speed.

However, as described above, the location of the HOS_VCM 230 in the HPS space managed by the first host OS 251 and the location of the GOS_VCM 420 in the HPA space managed by the second host OS 252 vary each time the physical computer 10 is booted up.

The first host OS 251 accordingly needs to find out the location of the HOS_VCM 230 in the HPA space managed by the first host OS 251 by referring to the HVA-HPA mapping information 240 in a case where a power cut is detected and backup processing is started. The first host OS 251 also needs to communicate to/from the second host OS 252 in order to find out the location of the GOS_VCM 420 in the HPA space managed by the second host OS 252.

Keeping track of data to be backed up thus requires the execution of numerous processing procedures, which makes it difficult to accomplish backup processing in a short time at low power consumption.

A solution of this embodiment is to have the first host OS 251 generate the HOS_VCM HPA space location information 250, which indicates the location of the HOS_VCM 230 in the HPA space managed by the first host OS 251, in a case where the first host OS 251 is booted up, and to have the second host OS 252 generate the GOS_VCM HPA space location information 600, which indicates the location of the GOS_VCM 420 in the HPA space managed by the second host OS 252, in cooperation with the relevant guest OS 400, in a case where the second host OS 252 is booted up.

This enables the first host OS 251 to find out a storage area in which data to be backed up is stored easily and quickly, and backup processing is therefore consequently accomplished in a short time at low power consumption.

(2) The GOS_VCM 420 illustrated in FIG. 14 is mapped to three storage area groups: a block 1 (801), a block 2 (802), and a block 3 (803) in the GPA space managed by the guest OS 400. The block 1 (801) in the GPA space managed by the guest OS 400 is mapped to a block 1 (901) in the HPA space managed by the second host OS 252. The block 2 (802) in the GPA space managed by the guest OS 400 is mapped to a block 2 (902) and a block 3 (930) in the HPA space managed by the second host OS 252. The block 3 in the GPA space managed by the guest OS 400 is mapped to a block 4 (904) in the HPA space managed by the second host OS 252. The GOS_VCM 420 is thus allocated storage area groups that have addresses non-consecutive from one another in the HPA space managed by the second host OS 252.

Recovery to the same state as immediately before a power cut is accomplished in the restoration processing by backing up data so that the location relation of the GOS_VCM 420 in the GVA space managed by the guest OS 400 is maintained.

The guest OS 400 therefore generates the GOS_VCM GPA space location information 440 in which entries for the three blocks in the GPA space managed by the guest OS 400 are sorted so as to reflect the location of the continuous storage area in the GVA space managed by the guest OS 400 (Step S404). The second host OS 252 generates the GOS_VCM HPA space location information 600 in which entries for the four blocks in the HPA space are sorted by the consecutive addresses in the GVA space managed by the guest OS 400.

The first host OS 251 reads pieces of data, and writes the read data into the relevant GOS_NVCM 720, in the order of entries of the GOS_VCM HPA space location information 600 as described later, thereby storing data in the GOS_NVCM 720 in the same state as consecutive pieces of image data of the GOS_VCM 420 in the GVA space managed by the guest OS 400.

The HOS_VCM HPA space location information 250 has the same technical features as well.

Details of the backup processing and the restoration processing are described next.

Figure 15:
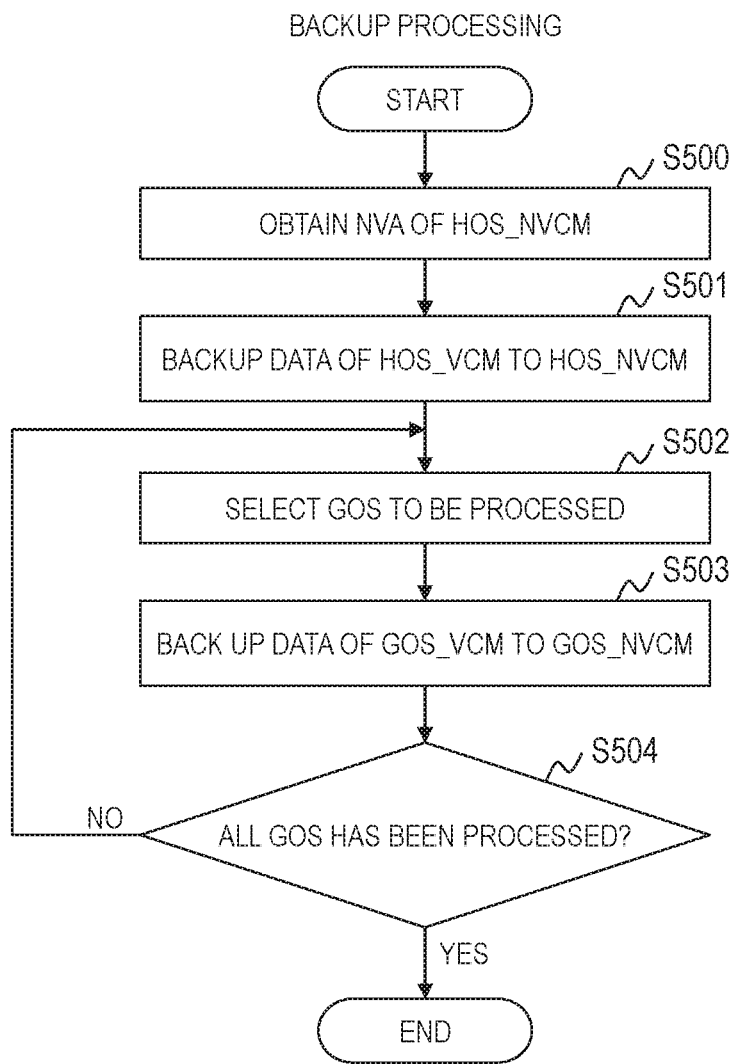
FIG. 15 is a flow chart for illustrating an example of backup processing according to the first embodiment of this invention.

FIG. 15 is a flow chart for illustrating an example of the backup processing according to the first embodiment of this invention.

In a case where a power cut is detected, the first host OS 251 refers to the NVCM NVA management information 700 to obtain the address (NVA) of the HOS_NVCM 710 (Step S500). Specifically, the first host OS 251 identifies a head address in the HOS_NVCM 710 at which data stored in the HOS_VCM 230 is saved.

The first host OS 251 refers to the HOS_VCM HPA space location information 250, which is stored in the first partial VRAM 221, and backs up data stored in the HOS_VCM 230 to the HOS_NVCM 710 (Step S501). Specifically, the following processing is executed.

The first host OS 251 selects one entry of the HOS_VCM HPA space location information 250 at a time from the top downwards. The first host OS 251 determines an address in the HOS_NVCM 710 at which data associated with the selected entry is to be written.

In the case of the topmost entry, the NVA obtained in Step S500 is determined as the address in the HOS_NVCM 710 at which the data is to be written. In the case of the subsequent entries, the first host OS 251 determines an address in the HOS_NVCM 710 at which the data is to be written based on an address that has been determined the last time and the size of data that has been written the last time.

The first host OS 251 reads the data from the HOS_VCM 230 and stores the read data in the HOS_NVCM 710. DMA transfer is used to write the data from the HOS_VCM 230 to the HOS_NVCM 710. An HPA recorded in the selected entry and the determined address are used in DMA transfer. Step S501 has now been described.

The first host OS 251 next refers to the NVCM NVA management information 700 to select the guest OS 400 to be processed (Step S502).

It is assumed here that the first host OS 251 selects the guest OS 400 to be processed by selecting one entry of the NVCM NVA management information 700 at a time from the top downwards. The first host OS 251 obtains the NVA 702 of the selected entry. The first host OS 251 also uses the OS_ID 701 of the selected entry to obtain from the shared VRAM 223 the GOS_VCM HPA space location information 600 that is associated with the guest OS 400 to be processed.

The first host OS 251 backs up data stored in the selected GOS_VCM 420 to the relevant GOS_NVCM 720 (Step S503). Specifically, the following processing is executed.

The first host OS 251 selects one of entries of the obtained GOS_VCM HPA space location information 600. In this case, the entries are selected one at a time from the top downwards. The first host OS 251 determines the address of the GOS_NVCM 720 at which data associated with the HPA 602 of the selected entry is to be written. The address can be determined by the same method that is used in Step S501.

The first host OS 251 reads the data from the GOS_VCM 420 based on the HPA 602 and size 603 of the selected entry, and stores the read data in the GOS_NVCM 720. DMA transfer is used to write the data from the GOS_VCM 420 to the GOS_NVCM 720. The HPA 602 and the size 603 that are recorded in the selected entry and the determined address are used in DMA transfer.

The first host OS 251 normally does not access the GOS_VCMs 420, which are included in the second partial VRAM 222. In a case where the backup processing and the restoration processing are executed, however, the first host OS 251 is set so as to access the second partial VRAM 222 temporarily. In another possible method, the first host OS 251 issues a read command to the second host OS 252.

In this embodiment, the first host OS 251 stores in the GOS_NVCM 720 pieces of data that are stored in the GOS_VCM 420 in the order of entries of the GOS_VCM HPA space location information 600. Therefore, as illustrated in FIG. 14, the pieces of data stored in the GOS_NVCM 720 are consecutive pieces of image data as in the GOS_VCM 420. Step S503 has now been described.

The first host OS 251 next determines whether or not every guest OS 400 has been processed (Step S504). Specifically, the first host OS 251 determines whether or not the backup processing has been finished for all entries of the guest OSes 400 registered in the NVCM NVA management information 700.

In a case where it is determined that not all of the guest OSes 400 have been processed, the first host OS 251 returns to Step S502 to execute the same processing for a new guest OS 400.

In a case where it is determined that every guest OS 400 has been processed, the first host OS 251 ends the backup processing.

Figure 16:
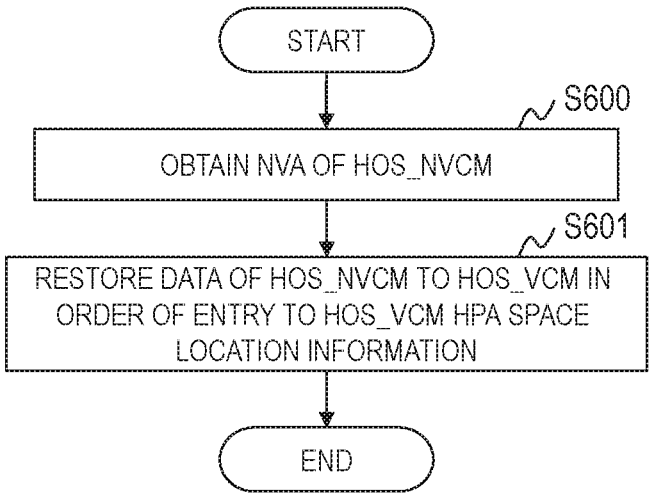
FIG. 16 is a flow chart for illustrating restoration processing of the first host OS according to the first embodiment of this invention.

FIG. 16 is a flow chart for illustrating restoration processing of the first host OS 251 according to the first embodiment of this invention.

After the processing of booting up the first host OS 251 is completed, the first host OS 251 starts the restoration processing. The first host OS 251 refers to the NVCM NVA management information 700 to obtain the address (NVA) of the HOS_NVCM 710 (Step S600). Specifically, the first host OS 251 identifies a head address in the HOS_NVCM 710 from which backup data is to be read.

The first host OS 251 refers to the HOS_VCM HPA space location information 250, which is stored in the first partial VRAM 221, restores data stored in the HOS_NVCM 710 to the HOS_VCM 230 (Step S601), and ends the restoration processing. Specifically, the following processing is executed.

The first host OS 251 selects one entry of the HOS_VCM HPA space location information 250 at a time from the top downwards. The first host OS 251 obtains a size that is recorded in the selected entry. The first host OS 251 determines an address at which data is to be read from the HOS_NVCM 710.

In the case of the topmost entry, the NVA obtained in Step S600 is determined as an address in the HOS_NVCM 710 from which data is to be read. In the case of the subsequent entries, the first host OS 251 determines an address in the HOS_NVCM 710 from which data is to be read based on an address that has been determined the last time and the size of data that has been read the last time.

The first host OS 251 reads from the HOS_NVCM 710 an amount of data that is indicated by a size recorded in the selected entry, and stores the read data in the HOS_VCM 230. DMA transfer is used to write the data from the HOS_NVCM 710 to the HOS_VCM 230. The HPA and the size that are recorded in the selected entry and the determined address are used in DMA transfer. Step S601 has now been described.

The HOS_VCM HPA space location information 250 referred to in Step S601 is generated after reboot. In the case where a storage area secured as the HOS_VCM 230 after reboot is switched from the storage area secured before reboot, the specifics of the HOS_VCM HPA space location information 250 referred to in Step S601 differ from the specifics of the HOS_VCM HPA space location information 250 referred to in the backup processing.

Figure 17A:
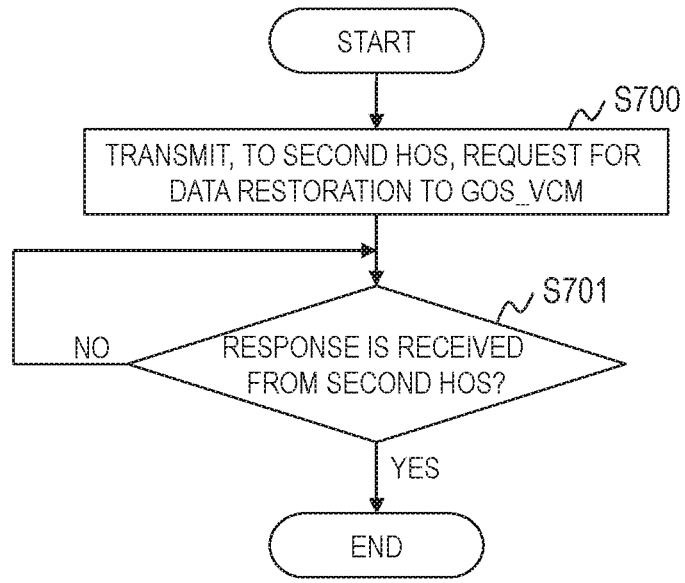
FIG. 17A, FIG. 17B, and FIG. 17C are flow charts for illustrating restoration processing of the guest OSes according to the first embodiment of this invention.
Figure 17B:
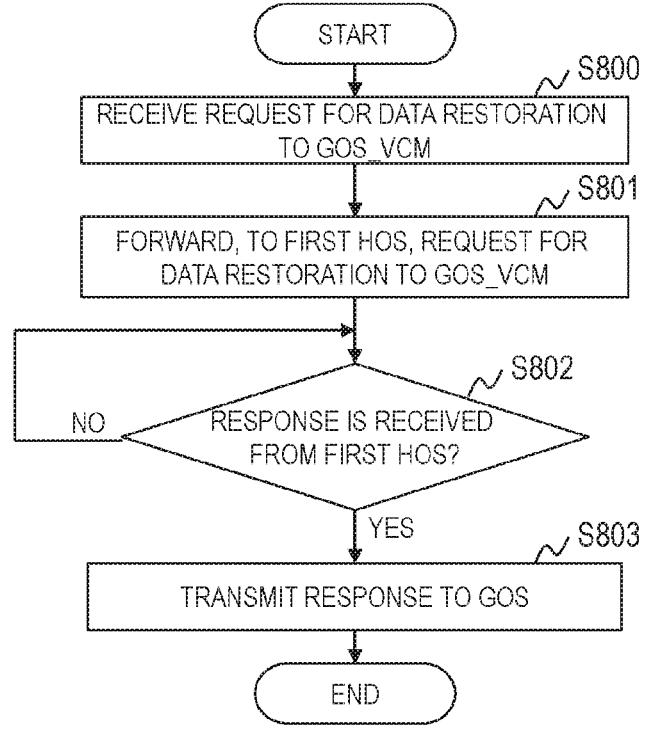
Figure 17C:
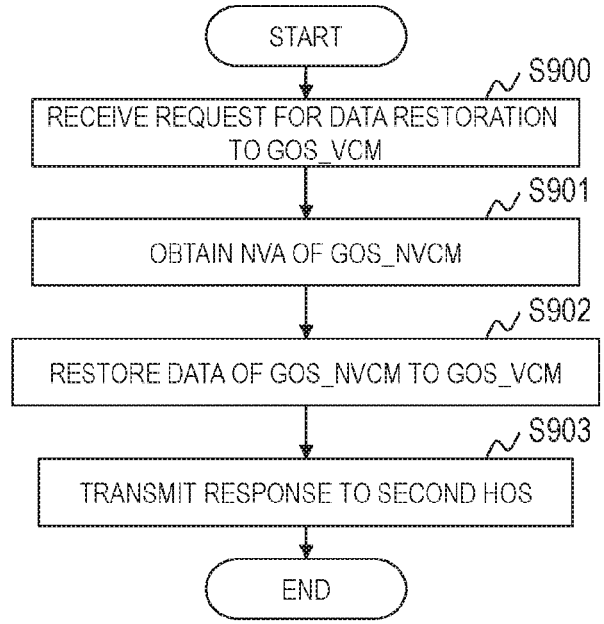
Figure 18:
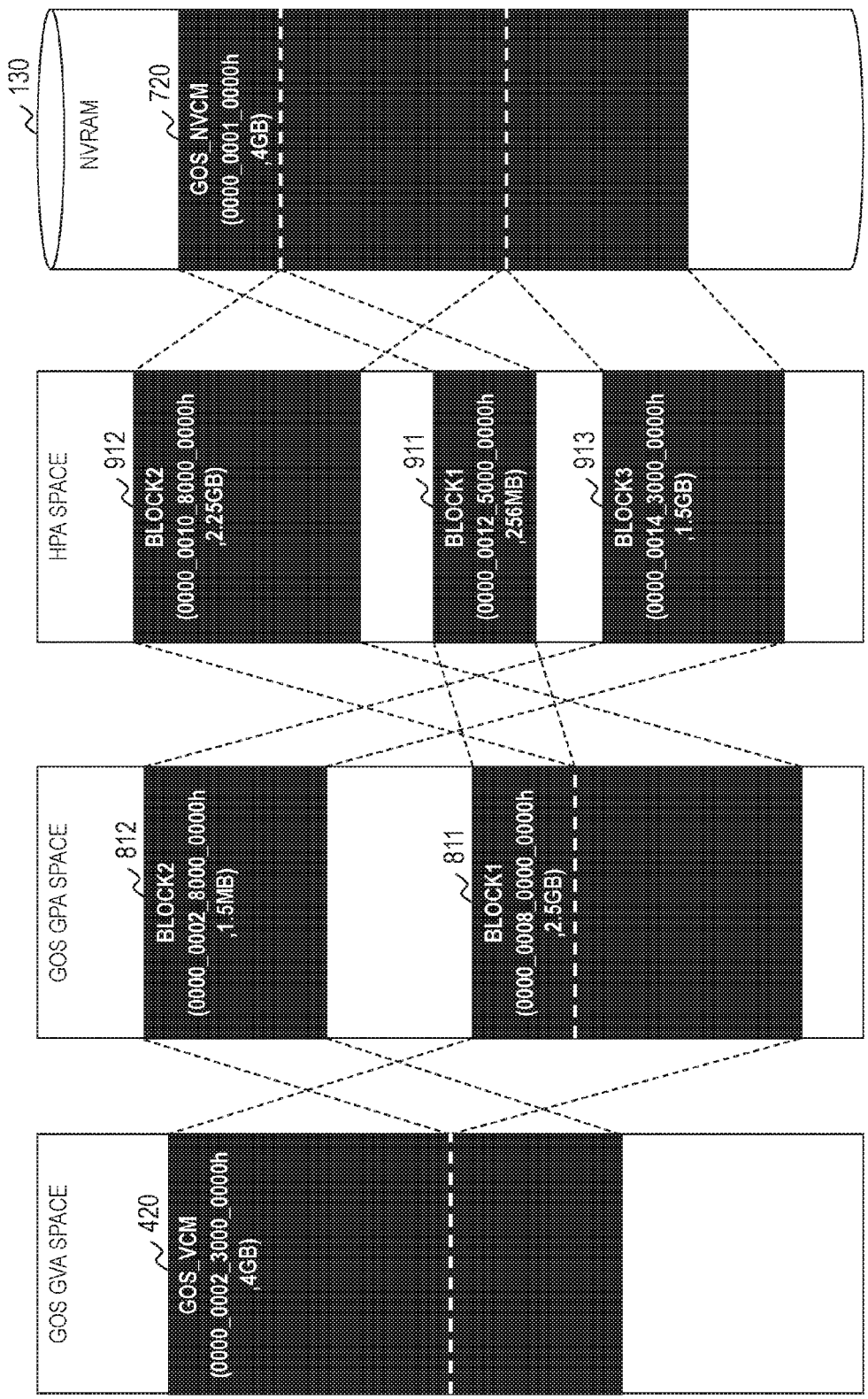
FIG. 18 is an explanatory diagram for illustrating an example of the location of one GOS_VCM in a GVA space, in a GPA space, and in an HPA space according to the first embodiment of this invention.

FIG. 17A, FIG. 17B, and FIG. 17C are flow charts for illustrating restoration processing of the guest OSes 400 according to the first embodiment of this invention. FIG. 18 is an explanatory diagram for illustrating an example of the location of one GOS_VCM 420 in a GVA space, in a GPA space, and in an HPA space according to the first embodiment of this invention.

Each guest OS 400 transmits, after the processing of booting up the guest OS 400 is completed, a request to restore data to the relevant GOS_VCM 420 to the second host OS 252 (Step S700). Thereafter, the guest OS 400 determines whether or not a response has been received from the second host OS 252 (Step S701).

In a case where it is determined that no response has been received from the second host OS 252, the guest OS 400 keeps waiting until a response is received from the second host OS 252. In a case where it is determined that a response has been received from the second host OS 252, the guest OS ends the processing of FIG. 17A.

The second host OS 252 receives from the guest OS 400 the request for data restoration to the GOS_VCM 420 (Step S800), and forwards to the first host OS 251 the request for data restoration to the GOS_VCM 420 (Step S801). The restoration request includes the identifier of the guest OS 400.

Thereafter, the second host OS 252 determines whether or not a response has been received from the first host OS 251 (Step S802). In a case where it is determined that no response has been received from the first host OS 251, the second host OS 252 keeps waiting until a response is received from the first host OS 251.

In a case where it is determined that a response has been received from the first host OS 251, the second host OS 252 transmits a response to the guest OS 400 (Step S803), and ends the processing of FIG. 17B.

The first host OS 251 receives from the second host OS 252 the request for data restoration to the GOS_VCM 420 (Step S900), and searches the NVCM NVA management information 700 for the identifier of the guest OS 400 that is included in the restoration request to obtain the address (NVA) of the GOS_NVCM 720 that is associated with the guest OS 400 (Step S901).

The first host OS 251 refers to the relevant GOS_VCM HPA space location information 600 stored in the shared VRAM 223, restores data stored in the GOS_NVCM 720 to the GOS_VCM 420 (Step S902), then transmits a response to the second host OS 252 (Step S903), and ends the processing of FIG. 17C. Specifically, the following processing is executed.

The first host OS 251 selects one entry of the GOS_VCM HPA space location information 600 at a time from the top downwards. The first host OS 251 obtains the size 703 of the selected entry. The first host OS 251 determines an address at which data is to be read from the GOS_NVCM 720.

In the case of the topmost entry, the NVA obtained in Step S901 is an address in the GOS_NVCM 720 from which data is to be read. In the case of the subsequent entries, the first host OS 251 determines an address in the GOS_NVCM 720 from which data is to be read based on an address that has been determined the last time and the size 703 of data that has been read the last time.

The first host OS 251 reads from the GOS_NVCM 720 an amount of data that is indicated by the size 703 of the selected entry, and stores the read data in the GOS_VCM 420. DMA transfer is used to write data from the GOS_NVCM 720 to the GOS_VCM 420. The NVA 702 and the size 703 that are recorded in the selected entry and the determined address in the GOS_NVCM 720 are used in DMA transfer. Step S902 has now been described.

The GOS_VCM HPA space location information 600 referred to in Step S902 is generated after reboot. In the case where a storage area secured as the GOS_VCM 420 after reboot is switched from the storage area secured before reboot, the specifics of the GOS_VCM HPA space location information 600 referred to in Step S902 differ from the specifics of the GOS_VCM HPA space location information 600 referred to in the backup processing.

The entries of the GOS_VCM HPA space location information 600 are sorted by addresses in a GVA space that is managed by the guest OS 400. Accordingly, restoring pieces of data to the GOS_VCM 420 in the order of entries of the GOS_VCM HPA space location information 600 with the first host OS 251 ensures that, as illustrated in FIG. 18, the pieces of data restored to the GOS_VCM 420 are pieces of image data having consecutive addresses in the GVA space as before reboot. In other words, the same memory state as before a power cut can be recovered.

The GOS_VCMs 420 are included in the second partial VRAM 222 and the first host OS 251 normally does not access the second partial VRAM 222. In a case where the backup processing and the restoration processing are executed, however, the first host OS 251 is set so as to temporarily access from the GOS_NVCM 720 to the second partial VRAM 222 in the shared VRAM 223. In another possible method, the first host OS 251 issues a read command to the second host OS 252. In still another possible method, the first host OS 251 writes data read from the GOS_NVCM 720 to the shared VRAM 223, and issues a command to the second host OS 252 to write this data.

In the case where a plurality of guest OSes 400 are rebooted, Processing of FIG. 17A to FIG. 17C are executed repeatedly to process one guest OS 400 at a time.

According to the present invention, the following effects are obtained in the backup processing.

Memory space address conversion processing which is necessary for the backup processing and the restoration processing is executed in a case where the physical computer 10 is booted up. Specifically, the first host OS 251 generates the HOS_VCM HPA space location information 250, which indicates the location of the HOS_VCM 230 in an HPA space that is managed by the first host OS 251, and the second host OS 252 (VMM) generates pieces of GOS_VCM HPA space location information 600, which indicate the locations of the GOS_VCMs 420 in an HPA space that is managed by the second host OS 252.

This enables the first host OS 251 to back up data stored in the HOS_VCM 230 easily and quickly by referring to the HOS_VCM HPA space location information 250 in a case where a power cut is detected, and to back up data that is stored in the GOS_VCM 420 of each guest OS 400 easily and quickly by referring to the relevant GOS_VCM HPA space location information 600.

In a case of using power from the battery power source 152 to execute backup processing, the first host OS 251 can thus back up data of VCMs in a short time at low power consumption without needing to execute complicate address conversion processing.

Entries of the HOS_VCM HPA space location information 250 and the GOS_VCM HPA space location information 600 are sorted so that GVA spaces managed by the guest OSes 400 each have consecutive addresses.

The first host OS 251 can therefore back up data stored in the HOS_VCM 230 in an HVA space that is managed by the first host OS 251 in a state that the data has been in at the time of power cut, by backing up the data stored in the HOS_VCM 230 to the HOS_NVCM 710 in the order of entries of the HOS_VCM HPA space location information 250. The first host OS 251 can also back up, for each guest OS 400, data stored in the GOS_VCM 420 in a GVA space that is managed by the guest OS 400 in a state that the data has been in at the time of power cut, by backing up the data stored in the GOS_VCM 420 to the relevant GOS_NVCM 720 in the order of entries of the relevant GOS_VCM HPA space location information 600.

According to the present invention, the following effects are obtained in the restoration processing.

As in the backup processing, the first host OS 251 can restore data stored in the HOS_NVCM 710 to the HOS_VCM 230 easily and quickly by referring to the HOS_VCM HPA space location information 250, and restore data that is stored in the GOS_NVCM 720 to the GOS_VCM 420 easily and quickly by referring to the relevant GOS_VCM HPA space location information 600.

In addition, as in the backup processing, the first host OS 251 can recover data of the HOS_VCM 230 in a state that the data has been in at the time of power cut by restoring data stored in the HOS_NVCM 710 to the HOS_VCM 230 in the order of entries of the HOS_VCM HPA space location information 250. The first host OS 251 can also recover, for each GOS_VCM 420, data of the GOS_VCM 420 in a state that the data has been in at the time of power cut by restoring data stored in the relevant GOS_NVCM 720 to the GOS_VCM 420 in the order of entries of the relevant GOS_VCM HPA space location information 600.

The description of the embodiment is directed to the example of using the control by hardware, but it is also possible to realize a part thereof by software.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit.

The above-described configurations and functions may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings shows control lines and information lines as considered necessary for explanation but do not show all control lines or information lines in the products. It can be considered that almost of all components are actually interconnected.

What is claimed is:

1. A computer, on which a plurality of operating systems run, the computer comprising, as physical resources:
   a processor;
   a volatile memory coupled to the processor;
   a non-volatile memory coupled to the processor; and
   an I/O device coupled to the processor,
   wherein the plurality of operating systems includes a first operating system and a second operating system configured to generate a plurality of virtual computers,
   wherein the first operating system is configured to run on a first logical resource, the first logical resource including a first logical processor, which is created by logically dividing the processor, a first logical volatile memory, which is created by logically dividing the volatile memory, and a first logical I/O device, which is created by logically dividing the I/O device,
   wherein the first operating system includes a power cut detecting unit configured to detect cutting of power to the computer,
   wherein the second operating system is configured to run on a second logical resource, the second logical resource including a second logical processor, which is created by logically dividing the processor, a second logical volatile memory, which is created by logically dividing the volatile memory, and a second logical I/O device, which is created by logically dividing the I/O device,
   wherein a third operating system is configured to run on each of the plurality of virtual computers,
   wherein the first operating system is configured to:
   secure in the first logical volatile memory, a first cache memory area in which data is to be stored temporarily in a case where the first operating system is booted up; and
   generate first location information, which indicates a location of the first cache memory area in a physical address space of the first logical volatile memory that the first operating system manages,
   wherein the second operating system is configured to generate at least one virtual computer and to boot up the third operating system on the at least one virtual computer,
   wherein the third operating system is configured to secure a second cache memory area in a virtual memory that is allocated to the at least one virtual computer,
   wherein the second operating system is configured to generate second location information, which indicates a location of the second cache memory area in a physical address space of the second logical volatile memory that the second operating system manages, and wherein the first operating system is configured to:
obtain first data stored in the first cache memory area based on the first location information in a case of being detected the cutting of power to the computer;
store the first data in the non-volatile memory;
obtain the second location information;
obtain second data stored in the second cache memory area from the second logical volatile memory based on the second location information; and
store the second data in the non-volatile memory.

2. The computer according to claim 1,
wherein, in a case where the computer is rebooted, the first operating system is configured to:
secure a new first cache memory area in the first logical volatile memory;
generate new first location information;
obtain the first data that is stored in the non-volatile memory; and
restore the first data to the secured new first cache memory area based on the generated new first location information,
wherein, in a case where the computer is rebooted, the second operating system is configured to generate at least one new virtual computer and to boot up the third operating system on the at least one generated new virtual computer,
wherein the third operating system is configured to secure new second cache memory area in a virtual memory that is newly allocated to the at least one generated new virtual computer,
wherein the second operating system is configured to:
generate new second location information; and
transmit, to the first operating system, a request for restoration of the second data which is issued by the third operating system running on the at least one virtual computer, and
wherein the first operating system is configured to:
obtain from the non-volatile memory the second data that is associated with the at least one virtual computer;
obtain the generated new second location information; and
restore the second data to the secured new second cache memory area based on the generated new second location information.

3. The computer according to claim 2,
wherein the second operating system is configured to generate first mapping information, which is used to manage a mapping relation between the physical address space that is managed by the second operating system and a physical address space that is managed by the third operating system in a case where the at least one virtual computer is generated,
wherein the third operating system is configured to:
generate second mapping information, which is used to manage an association relation between the physical address space managed by the third operating system and a virtual address space managed by the third operating system;
secure, as the second cache memory area, a continuous storage area in the virtual address space managed by the third operating system;
identify locations of a plurality of storage areas that form the second cache memory area in the physical address space of a virtual memory that the third operating system manages based on the second mapping information;
generate a plurality of entries including physical addresses of the identified plurality of storage areas in the physical address space of the virtual memory that the third operating system manages; and
generate third location information, which indicates the location of the second cache memory area in the physical address space of the virtual memory that the third operating system manages, by sorting the plurality of generated entries by addresses of the second cache memory area in the virtual address space that the third operating system manages, and
wherein the second operating system is configured to:
identify, in a case of generating the second location information, locations of the plurality of storage areas that form the second cache memory area in the physical address space of the second logical volatile memory that the second operating system manages based on the third location information and on the first mapping information;
generate a plurality of entries including physical addresses of the identified plurality of storage areas in the physical address space of the second logical volatile memory that the second operating system manages; and
generate the second location information by sorting the plurality of generated entries by addresses of the second cache memory area in the virtual address space that the third operating system manages.

4. The computer system according to claim 3, wherein the first operating system is configured to store the second data in the non-volatile memory in an order of addresses in the virtual address space in the virtual memory that the third operating system manages in a case of backing up the second data that is stored in the virtual memory.

5. The computer according to claim 4,
wherein the non-volatile memory includes a first non-volatile cache memory area, which is formed of storage areas having consecutive addresses and which stores the first data, and a second non-volatile cache memory area, which is formed of storage areas having consecutive addresses and which stores the second data of the at least one virtual computer, and
wherein the first operating system is configured to:
read data stored in storage areas that form the first cache memory area, in an order of entries of the first location information;
store the data read from the storage areas that form the first cache memory area, in an order of the addresses of the first non-volatile cache memory area;
read data stored in the storage areas that form the second cache memory area, in an order of entries of the second location information; and
store the data read from the storage areas that form the second cache memory area, in the order of the addresses of the second non-volatile cache memory area.

6. A method of managing cache data in a computer on which a plurality of operating systems run,
the computer including, as physical resources:
a processor;
a volatile memory, which is coupled to the processor;
a non-volatile memory, which is coupled to the processor; and
an I/O device, which is coupled to the processor,
the plurality of operating systems including a first operating system and a second operating system, which is configured to generate a plurality of virtual computers, the first operating system being configured to run on a first logical resource, the first logical resource including a first logical processor, which is created by logically dividing the processor, a first logical volatile memory, which is created by logically dividing the volatile memory, and a first logical I/O device, which is created by logically dividing the I/O device, the first operating system including a power cut detecting unit, which is configured to detect cutting of power to the computer, the second operating system being configured to run on a second logical resource, the second logical resource including a second logical processor, which is created by logically dividing the processor, a second logical volatile memory, which is created by logically dividing the volatile memory, and a second logical I/O device, which is created by logically dividing the I/O device, the plurality of virtual computers each being configured to run a third operating system, the cache data management method including:

a first step of securing, by the first operating system, in the first logical volatile memory, a first cache memory area in which data is to be stored temporarily, in a case where the first operating system is booted up;

a second step of generating, by the first operating system, first location information, which indicates a location of the first cache memory area in a physical address space of the first logical volatile memory that the first operating system manages;

a third step of generating, by the second operating system, at least one virtual computer and booting up the third operating system on the at least one virtual computer;

a fourth step of securing, by the third operating system, a second cache memory area in a virtual memory allocated to the at least one virtual computer;

a fifth step of generating, by the second operating system, second location information, which indicates a location of the second cache memory area in a physical address space of the second logical volatile memory that the second operating system manages;

a sixth step of obtaining, by the first operating system, first data stored in the first cache memory area based on the first location information, and storing the first data in the non-volatile memory, in a case of being detected the cutting of power to the computer;

a seventh step of obtaining, by the first operating system, the second location information; and an eighth step of obtaining, by the first operating system, second data stored in the second cache memory area from the second logical volatile memory based on the second location information, and storing the second data in the non-volatile memory.

7. The cache data management method according to claim 6, further including:

a ninth step of securing, by the first operating system, a new first cache memory area in the first logical volatile memory in a case where the computer is rebooted;

a tenth step of generating, by the first operating system, new first location information;

an eleventh step of obtaining, by the first operating system, the first data that is stored in the non-volatile memory;

a twelfth step of restoring, by the first operating system, the first data to the secured new first cache memory area, based on the generated new first location information;

a thirteenth step of generating, by the second operating system, at least one new virtual computer, and booting up the third operating system on the at least one generated new virtual computer, in a case where the computer is rebooted;

a fourteenth step of securing, by the third operating system, new second cache memory area in a virtual memory that is newly allocated to the at least one generated new virtual computer;

a fifteenth step of generating, by the second operating system, new second location information;

a sixteenth step of transmitting, by the second operating system, to the first operating system, a request for restoration of the second data which is issued by the third operating system running on the at least one virtual computer;

a seventeenth step of obtaining, by the first operating system, the second data that is associated with the at least one virtual computer from the non-volatile memory;

an eighteenth step of obtaining, by the first operating system, the generated new second location information; and a nineteenth step of restoring, by the first operating system, the second data to the secured new second cache memory area based on the generated new second location information.

8. The cache data management method according to claim 7, wherein the third step and the thirteenth step include generating, by the second operating system, first mapping information, which is used to manage a mapping relation between the physical address space that is managed by the second operating system and a physical address space that is managed by the third operating system, wherein the fourth step and the fourteenth step include:

generating, by the third operating system, second mapping information, which is used to manage an association relation between the physical address space managed by the third operating system and a virtual address space managed by the third operating system;

securing, by the third operating system, as the second cache memory area, a continuous storage area in the virtual address space managed by the third operating system;

identifying, by the third operating system, locations of a plurality of storage areas that form the second cache memory area in the physical address space of a virtual memory that the third operating system manages based on the second mapping information;

generating, by the third operating system, a plurality of entries including physical addresses of the identified plurality of storage areas in the physical address space of the virtual memory that the third operating system manages; and generating, by the third operating system, third location information, which indicates the location of the second cache memory area in the physical address space of the virtual memory that the third operating system manages, by sorting the plurality of generated entries by addresses of the second cache memory area in the virtual address space that the third operating system manages, and wherein the fifth step and the fifteenth step include:

identifying, by the second operating system, locations of the plurality of storage areas that form the second cache memory area in the physical address space of the second logical volatile memory that the second operating system manages based on the third location information and on the first mapping information;

generating, by the second operating system, a plurality of entries including physical addresses of the identified plurality of storage areas in the physical address space of the second logical volatile memory that the second operating system manages; and generating, by the second operating system, the second location information by sorting the plurality of generated entries by addresses of the second cache memory area in the virtual address space that the third operating system manages.

9. The cache data management method according to claim 8, wherein the tenth step includes storing, by the first operating system, the second data in the non-volatile memory in an order of addresses in the virtual address space in the virtual memory that the third operating system manages.

10. The cache data management method according to claim 9,
wherein the non-volatile memory includes a first non-volatile cache memory area, which is formed of storage areas having consecutive addresses and which stores the first data, and a second non-volatile cache memory area, which is formed of storage areas having consecutive addresses and which stores the second data of the at least one virtual computer, wherein the sixth step includes:

reading, by the first operating system, data stored in storage areas that form the first cache memory area, in an order of entries of the first location information; and storing, by the first operating system, the data read from the storage areas that form the first cache memory area, in an order of the addresses of the first non-volatile cache memory area, and wherein the eighth step includes:

reading, by the first operating system, data stored in the storage areas that form the second cache memory area, in an order of entries of the second location information; and storing, by the first operating system, the data read from the storage areas that form the second cache memory area, in the order of the addresses of the second non-volatile cache memory area.

* * * * *